(12) United States Patent
Baker et al.

(10) Patent No.: US 12,533,374 B2
(45) Date of Patent: Jan. 27, 2026

(54) COMPOSITIONS AND METHODS OF USE THEREOF

(71) Applicant: SYNEDGEN, INC., Claremont, CA (US)

(72) Inventors: Shenda M. Baker, Upland, CA (US); William P. Wiesmann, Chevy Chase, MD (US)

(73) Assignee: SYNEDGEN, INC., Claremont, CA (US)

( * ) Notice: Subject to any disclaimer, the term of this patent is extended or adjusted under 35 U.S.C. 154(b) by 493 days.

(21) Appl. No.: 17/922,229

(22) PCT Filed: Apr. 30, 2021

(86) PCT No.: PCT/US2021/030132
§ 371 (c)(1),
(2) Date: Oct. 28, 2022

(87) PCT Pub. No.: WO2021/222727
PCT Pub. Date: Nov. 4, 2021

(65) Prior Publication Data
US 2023/0201248 A1 Jun. 29, 2023

(51) Int. Cl.
A61K 31/726 (2006.01)
A61P 31/04 (2006.01)
A61K 45/06 (2006.01)

(52) U.S. Cl.
CPC ............ *A61K 31/726* (2013.01); *A61P 31/04* (2018.01); *A61K 45/06* (2013.01)

(58) Field of Classification Search
None
See application file for complete search history.

(56) References Cited

U.S. PATENT DOCUMENTS

| | | |
|---|---|---|
| 8,119,780 B2 | 2/2012 | Baker et al. |
| 8,399,635 B2 | 3/2013 | Baker et al. |
| 8,658,775 B2 | 2/2014 | Baker et al. |
| 8,916,542 B2 | 12/2014 | Baker et al. |
| 9,012,429 B2 | 4/2015 | Baker et al. |
| 9,029,351 B2 | 5/2015 | Baker et al. |
| 9,234,050 B2 | 1/2016 | Baker et al. |
| 9,439,925 B2 | 9/2016 | Baker et al. |
| 9,732,164 B2 | 8/2017 | Baker et al. |
| 2003/0087414 A1 | 5/2003 | Aerts et al. |
| 2003/0181416 A1 | 9/2003 | Comper |
| 2004/0242626 A1 | 12/2004 | Achari et al. |
| 2006/0140911 A1 | 6/2006 | Sharp et al. |
| 2007/0117783 A1 | 5/2007 | Brueck-Scheffler |
| 2007/0281904 A1 | 12/2007 | Baker et al. |
| 2009/0304664 A1 | 12/2009 | Lindquist et al. |
| 2010/0056474 A1 | 3/2010 | Baker et al. |
| 2012/0295355 A1 | 11/2012 | Baker et al. |
| 2012/0301408 A1 | 11/2012 | Baker et al. |
| 2012/0329751 A1* | 12/2012 | Baker ............ A61P 31/04 514/54 |
| 2013/0019860 A1 | 1/2013 | Depla et al. |
| 2013/0210761 A1 | 8/2013 | Baker et al. |
| 2014/0080785 A1 | 3/2014 | Baker et al. |
| 2014/0221308 A1 | 8/2014 | Baker et al. |
| 2014/0234310 A1 | 8/2014 | Shapiro |
| 2015/0031610 A1 | 1/2015 | Baker et al. |
| 2015/0224044 A1 | 8/2015 | Baker et al. |
| 2016/0022564 A1 | 1/2016 | Townsend et al. |
| 2016/0022730 A1 | 1/2016 | Baker et al. |
| 2016/0060362 A1 | 3/2016 | Baker et al. |
| 2017/0119810 A1 | 5/2017 | Baker et al. |
| 2017/0136056 A1 | 5/2017 | Baker et al. |
| 2017/0304355 A1 | 10/2017 | Baker et al. |
| 2020/0009182 A1 | 1/2020 | Baker et al. |
| 2020/0009183 A1* | 1/2020 | Baker ............ A61P 29/00 |

FOREIGN PATENT DOCUMENTS

| | | |
|---|---|---|
| JP | 2009522328 A | 6/2009 |
| JP | 2010507617 A | 1/2015 |
| WO | WO-0036915 A1 | 6/2000 |
| WO | WO-07/077164 A1 | 7/2007 |
| WO | WO-2007/142704 A3 | 5/2008 |
| WO | WO-2008/072230 A1 | 6/2008 |
| WO | WO-08049842 A3 | 9/2008 |
| WO | WO-2010056927 A1 | 5/2010 |
| WO | WO-2011/028967 A1 | 3/2011 |
| WO | WO-2011028968 A1 | 3/2011 |
| WO | WO-2011028968 A8 | 4/2011 |
| WO | WO-2013134129 A3 | 6/2015 |
| WO | WO-2016040899 A1 * | 3/2016 ........... A61K 31/427 |

(Continued)

OTHER PUBLICATIONS

Tre-Hardy, et al., "In vitro activity of antibiotic combinations against Pseudomonas aeruginosa biofilm and planktonic cultures", International Journal of Antimicrobial Agents, Elsevier Science, Amsterdam, NL., vol. 31, No. 4; Feb. 14, 2008.

Tin San, et al., "Activity of Chitosans in combination with antibiotics in Pseudomonas aeruginosa" International Journal of Biological Sciences, vol. 5., No. 2, Mar. 1, 2009.

Supplementary European Search Report dated Apr. 10, 2013 for EP 10 81 4536.

International Search Report and Written Opinion for International Application No. PCT/US2010/047758, dated Nov. 1, 2010.

Singh, P. K. et al., Nature, "Quorum-sensing signals indicate that cystic fibrosis lungs are infected with bacterial biofilms", Oct. 2000, vol. 407, pp. 762-764.

(Continued)

*Primary Examiner* — Traviss C McIntosh, III
(74) *Attorney, Agent, or Firm* — GOODWIN PROCTER LLP

(57) ABSTRACT

Described herein are methods of treating a Nontuberculosis Mycobacteria (NTM) infection in a subject in need thereof, the methods comprising administering an effective amount of a polyglucosamine derivative or a composition comprising a polyglucosamine derivative.

20 Claims, 10 Drawing Sheets

(56) References Cited

FOREIGN PATENT DOCUMENTS

| WO | WO-2016/172595 A1 | 10/2016 |
| WO | WO-2021/221656 A1 | 11/2021 |
| WO | WO-2021/222727 A1 | 11/2021 |

OTHER PUBLICATIONS

Extended European Search Report for EP application No. 17182792. 6, dated Mar. 2, 2018.

Full Examination Report for Australian Patent Application No. 2015314755, dated Jan. 29, 2019.

International Search Report and Written Opinion for PCT/US2015/049835, dated Dec. 31, 2015.

Supplementary European Search Report mailed on Mar. 22, 2018 for EP 15840207.

European Search Opinion mailed on Mar. 22, 2018 for EP15840207.

Deneuville et al. "Revisited Physicochemical and Transport Properties of Respiratory Mucus in Genotyped Cystic Fibrosis Patients" American Journal of Respiratory Critical Care Medicine. 1997, vol. 156 pp. 166-172.

Actor et al. "Lactoferrin as a Natural Immune Modulator" Curr Pharm Des. 2009, vol. 15, pp. 1956-1973.

Sharma et al. "Antibiotics versus biofilm: an emerging battleground in microbial communities", Antimicrobial Resistance and Infection Control (2019) 8:76.

Flemming, et al. "The EPS Matrix: The House of Biofilm Cells", Journal of Bacteriology, Nov. 2007, p. 7945-7947.

Herrero R, et. al. "New insights into the mechanisms of pulmonary edema in acute lung injury." Ann Transl Med 2018;6(2):32. doi: 10.21037/atm.2017.12.18.

Jiang et al. "Regulation of lung injury and repair by Toll-like receptors and hyaluronan" Nature, (2005) pp. 1173-1179.

Pechos RD "With Friends Like These: The Complex Role of Neutrophils in the Progression of Severe Pneumonia", Front. Cell. Infect. Microbiol. 7:160.

Yang S-C et al., "Understanding the role of neutrophils in acute respiratory distress syndrome." Biomedical Journal, http://doi.org/10/1016/j.bj.2020.09.001.

Maria Cristina Bonferoni et.al. (2009) Chitosan and its salts for mucosal and transmucosal delivery, Expert Opinion on Drug Delivery, 6:9, 923-939, DOI: 10.1517/17425240903114142.

Khalil, H. et al., Antimicrobial Agents and Chemotherapy, "Synergy between Polyethylenimine and Different Families of Antibiotics against a Resistant Clinical Isolate of Pseudomonas aeruginosa", 2008, vol. 52, No. 5, pp. 1635-1641 (Year: 2008).

Narayanaswamy et al, (2018) "Novel Glycopolymer Eradicates Antibiotic- and CCCP-Induced Persister Cells in Pseudomonas aeruginosa," Front. Micbrobiol, 9:1724.

Robert C. Read et al. "Effective nasal influenza vaccine delivery using chitosan". Vaccine 23 (2005) 4367-4374.

International Search Report and Written Opinion issued for PCT/US20/30702, mailed on Jul. 27, 2020 (8 pages).

International Search Report and Written Opinion issued for PCT/US21/30132, mailed on Sep. 9, 2021.

Johnson et al., "Nontuberculous mycobacterial pulmonary infections" *J Thorac Dis* 2014;6(3):210-220.

Henkle et al., "Nontuberculous Mycobacteria Infections in Immunosuppressed Hosts" *Clin Chest Med.* Mar. 2015; 36(1):91-99.

Johnson et al., "Nontuberculous mycobacterial pulmonary infections" *J Thorac Dis* 20 1 4;6(3):210--220.

Narayanaswamy et al., "In Vitro Activity of a Novel Glycopolymer against Biofilms of *Burkholderia cepacia* Complex Cystic Fibrosis Clinical Isolates" Antimicrobial Agents and Chemotherapy, 2019; 63(6); 1-11.

Fang et al., "Characterization of *Burkholderia cepacia* complex from cystic fibrosis patients in China and their chitosan susceptibility," *World Journal of Microbiology and Biotechnology*; 2010; 27, 443-450.

Garcia et al., "Poly (acetyl, arginyl) glucosamine disrupts Pseudomonas aeruginosa biofilms and enhances bacterial clearance in a rat lung infection model", Microbiology 2022; 168:001121, 12 pages.

Fisher et al., "Persistent bacterial infections and persister cells," Nat. Rev. Microbiol., 2017, 15, pp. 453-464.

U.S. Appl. No. 16/572,053 US 2020/0009182, filed Sep. 16, 2019, Methods and Compositions for Disrupting Biofilm Utilizing Chitosan-Derivative Compouds, Published.

U.S. Appl. No. 16/573,559 US 2020/0009183, filed Sep. 17, 2019, Compositions and Methods of Use Thereof, Published.

Cook, Gregory M. et al: "Physiology of Mycobacteria", In: "Physiology of Mycobacteria", Jul. 31, 2013, vol. 55, pp. 81-319.

Jarzembowski Jason A. et al: "Nontuberculous Mycobacterial Infections", Archives of Pathology & Laboratory Medicine, vol. 132, No. 8, Aug. 1, 2008, pp. 1333-1341.

Koh Won-Jung, "Nontuberculous Mycobacteria—Overview", Microbiology spectrum, Jan. 1, 2017, pp. 1-7.

Extended European Search Report and Search Opinion for European Application No. 20933254.3, issued on Dec. 21, 2023, 13 pages.

* cited by examiner

MABSC

MAC

COMPOSITIONS AND METHODS OF USE THEREOF

CROSS-REFERENCE TO RELATED APPLICATIONS

This application is a national phase filing under 35 U.S.C. § 371 of International (PCT) Patent Application No. PCT/US2021/030132, filed on Apr. 30, 2021, which claims the benefit of and priority under 35 U.S.C. §§ 119(a) and 365(b) to International (PCT) Patent Application No. PCT/US2020/030702 filed on Apr. 30, 2020, the entire content of each of which is incorporated herein by reference.

BACKGROUND

The prevalence of Nontuberculosis Mycobacteria (NTM) pulmonary infections, for example, in cystic fibrosis (CF) patients (US Registry 2017) and other populations such as bronchiectasis is increasing. Nontuberculosis Mycobacteria infection results in rapid deterioration and decline in pulmonary functions, leading to increased morbidity and mortality having a significant impact on quality of life with severe cough, extreme fatigue, and shortness of breath. Treatment of NTM pulmonary infection is complicated by NTM's tendency for antibiotic resistance, slow growth, and ability to form biofilms and recalcitrant persister cells. These persister cells reflect a state of dormancy which are resilient to antibiotic exposure and are able to resume growth after antibiotic removal contributing to the chronicity of infection (Fisher, R. A. et al, *Nat. Rev. Microbiol.* 2017, Vol. 15, pp. 453-464). Antibiotic tolerant persister cells remain concentrated in biofilms, and the biofilm structure reduces the penetration and activity of antibiotics limiting their therapeutic effectiveness. This collection of resistance, tolerance and persistance mechanisms becomes a part of NTM pathogenesis leading to treatment regimens with poor results, significant associated toxicity, and high relapse rates. Limited options for antibiotic treatment of NTM exist, and many of the standard antibiotics have toxic side effects and long treatment durations. Thus, new and improved compounds, compositions, and methods are desired for treatment and prevention of NTM infections. The compounds, compositions, and methods described herein are directed toward this end.

SUMMARY

Provided herein are polyglucosamine derivatives useful in methods of treating a Nontuberculosis Mycobacteria (NTM) infection (e.g., pulmonary NTM infection (e.g., chronic pulmonary NTM infection or acute pulmonary NTM infection), chronic NTM infection, or acute NTM infection) in a subject in need thereof.

Thus, in one aspect, provided herein is a method of treating a pulmonary nontuberculosis mycobacteria (NTM) infection (e.g., chronic or acute pulmonary NTM infection) in a subject in need thereof, the method comprising administering to the subject an effective amount of a poly(acetyl, arginyl) glucosamine (PAAG) comprising the following Formula (I):

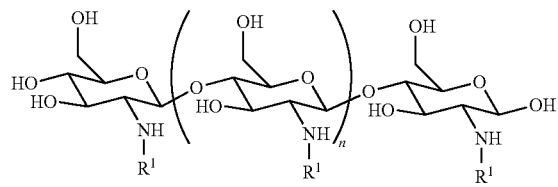

Formula (I)

wherein:

n is an integer between 20 and 6000; and each $R^1$ is independently selected for each occurrence from hydrogen, acetyl,

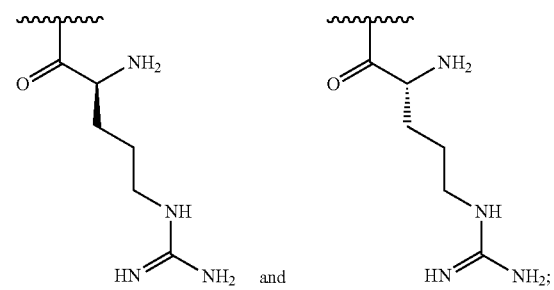 [SMILES: *C(=O)[C@@H](N)CCCNC(=N)N ; *C(=O)[C@H](N)CCCNC(=N)N]

wherein at least 25% of $R^1$ substituents are H, at least 1% of $R^1$ substituents are acetyl, and at least 2% of $R^1$ substituents are

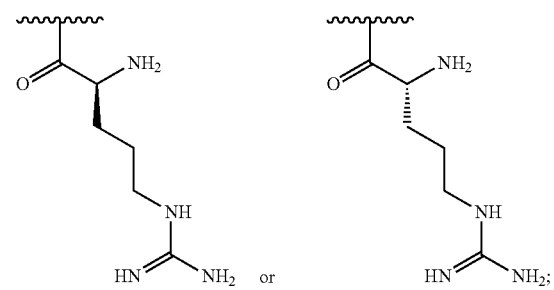 [SMILES: *C(=O)[C@@H](N)CCCNC(=N)N ; *C(=O)[C@H](N)CCCNC(=N)N]

wherein the treatment comprises achieving a negative NTM cell sputum culture of the subject.

In another aspect, provided herein is a method of treating an acute nontuberculosis mycobacteria (NTM) infection in a subject in need thereof, the method comprising administering to the subject an effective amount of a poly(acetyl, arginyl) glucosamine (PAAG) comprising the following Formula (I):

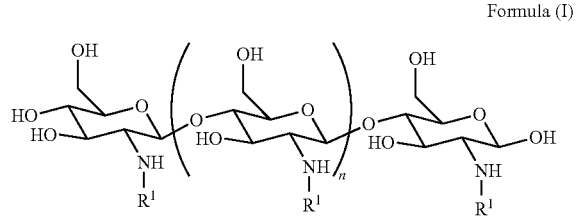

Formula (I)

wherein:

n is an integer between 20 and 6000; and each $R^1$ is independently selected for each occurrence from hydrogen, acetyl,

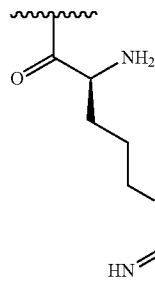 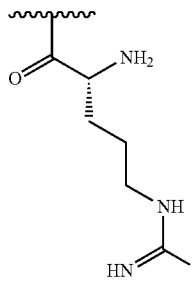

wherein at least 25% of $R^1$ substituents are H, at least 1% of $R^1$ substituents are acetyl, and at least 2% of $R^1$ substituents are

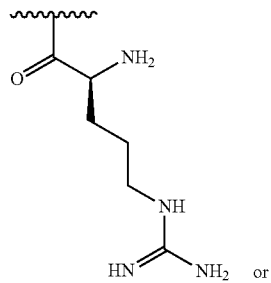 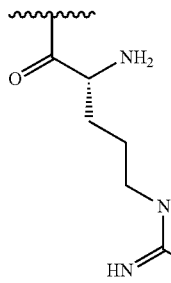

wherein the treatment comprises achieving a negative NTM cell sputum culture of the subject.

In another aspect, provided herein is a method of treating a chronic nontuberculosis mycobacteria (NTM) infection in a subject in need thereof, the method comprising administering to the subject an effective amount of a poly(acetyl, arginyl) glucosamine (PAAG) comprising the following Formula (I):

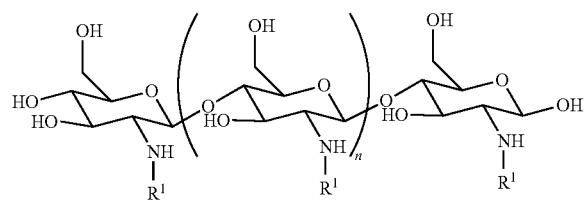

Formula (I)

wherein:

n is an integer between 20 and 6000; and each $R^1$ is independently selected for each occurrence from hydrogen, acetyl,

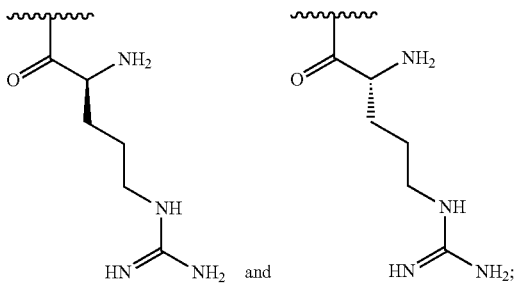 [SMILES: *C(=O)[C@@H](N)CCCNC(=N)N ; *C(=O)[C@H](N)CCCNC(=N)N]

wherein at least 25% of $R^1$ substituents are H, at least 1% of $R^1$ substituents are acetyl, and at least 2% of $R^1$ substituents are

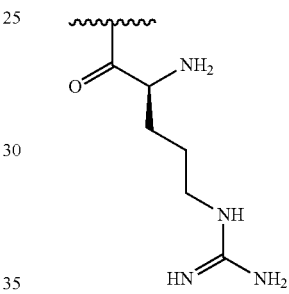 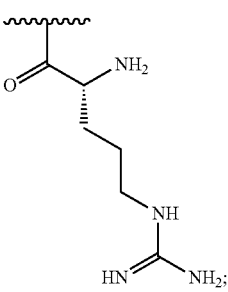

wherein the treatment comprises achieving a negative NTM cell sputum culture of the subject.

In another aspect, provided herein is a method of treating a pulmonary nontuberculosis mycobacteria (NTM) infection (e.g., chronic or acute pulmonary NTM infection) in a subject in need thereof, the method comprising administering to the subject an effective amount of a poly(acetyl, arginyl) glucosamine (PAAG) comprising the following Formula (I):

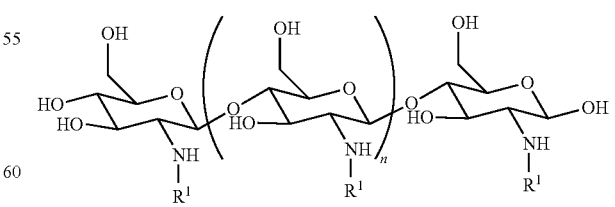

Formula (I)

wherein:

n is an integer between 20 and 6000; and each $R^1$ is independently selected for each occurrence from hydrogen, acetyl,

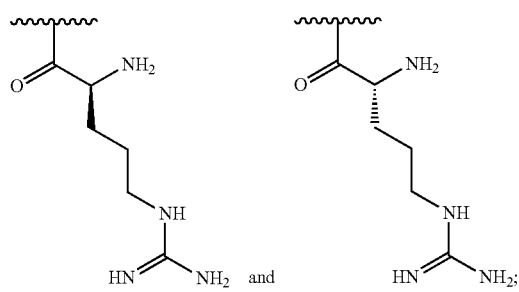 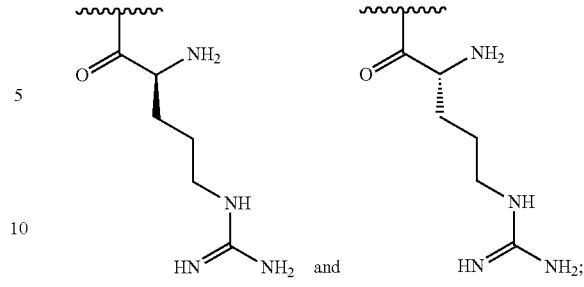

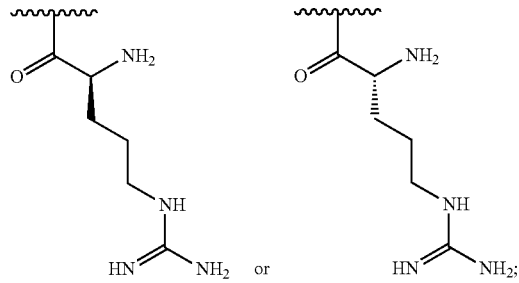 [SMILES: *C(=O)[C@@H](N)CCCNC(=N)N ; *C(=O)[C@H](N)CCCNC(=N)N]

wherein at least 25% of $R^1$ substituents are H, at least 1% of $R^1$ substituents are acetyl, and at least 2% of $R^1$ substituents are

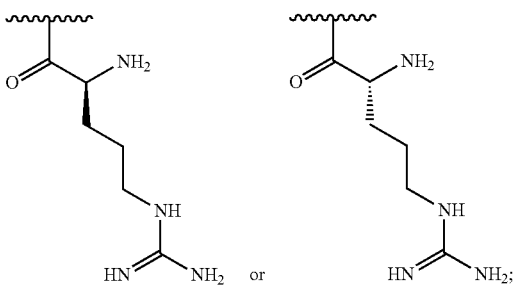 [SMILES: *C(=O)[C@@H](N)CCCNC(=N)N ; *C(=O)[C@H](N)CCCNC(=N)N]

wherein the treatment results in an undetectable amount of NTM cells in the subject.

wherein at least 25% of $R^1$ substituents are H, at least 1% of $R^1$ substituents are acetyl, and at least 2% of $R^1$ substituents are wherein the treatment results in an undetectable amount of NTM cells in the subject.

In another aspect, provided herein is a method of treating an acute nontuberculosis mycobacteria (NTM) infection in a subject in need thereof, the method comprising administering to the subject an effective amount of a poly(acetyl, arginyl) glucosamine (PAAG) comprising the following Formula (I):

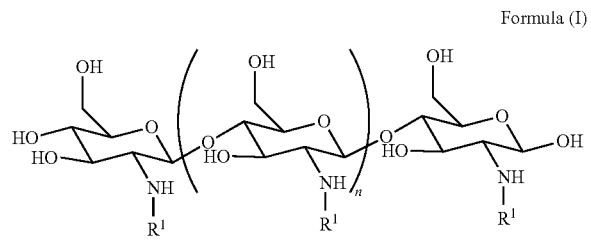

Formula (I)

wherein:
n is an integer between 20 and 6000; and each $R^1$ is independently selected for each occurrence from hydrogen, acetyl, In another aspect, provided herein is a method of treating a chronic nontuberculosis mycobacteria (NTM) infection in a subject in need thereof, the method comprising administering to the subject an effective amount of a poly(acetyl, arginyl) glucosamine (PAAG) comprising the following Formula (I):

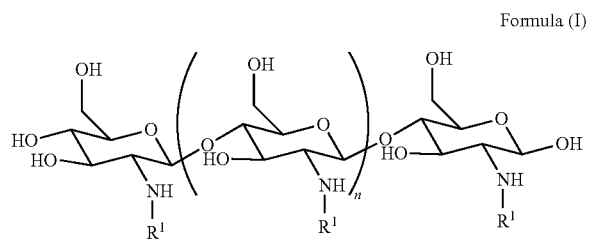

Formula (I)

wherein:
n is an integer between 20 and 6000; and each $R^1$ is independently selected for each occurrence from hydrogen, acetyl,

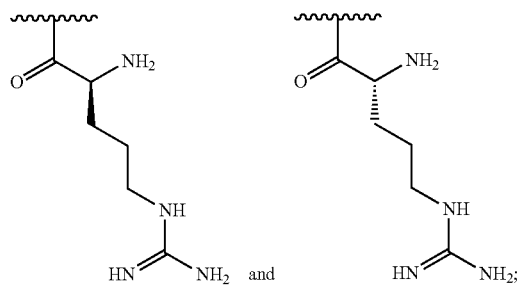 [SMILES: *C(=O)[C@@H](N)CCCNC(=N)N ; *C(=O)[C@H](N)CCCNC(=N)N] 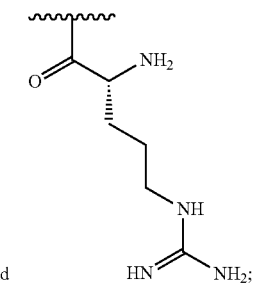

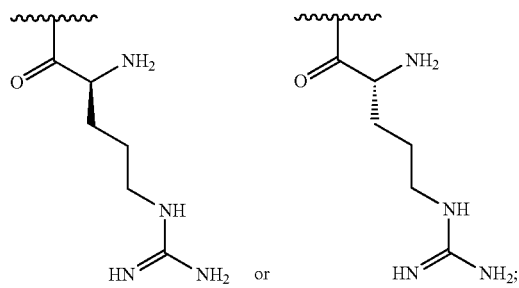 [SMILES: *C(=O)[C@@H](N)CCCNC(=N)N ; *C(=O)[C@H](N)CCCNC(=N)N] 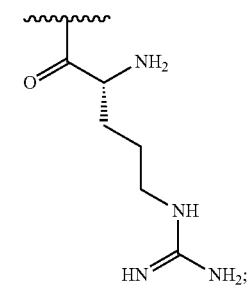

wherein at least 25% of $R^1$ substituents are H, at least 1% of $R^1$ substituents are acetyl, and at least 2% of $R^1$ substituents are wherein the treatment results in an undetectable amount of NTM cells in the subject.

In another aspect, provided herein is a method of eradicating an entire population of nontuberculosis mycobacteria (NTM) cells in an environment selected from the group consisting of a subject, a sample, a biofilm, a surface, and a medical device, the method comprising administering to the environment an effective amount of a poly(acetyl, arginyl) glucosamine (PAAG) comprising the following formula comprising the following Formula (I):

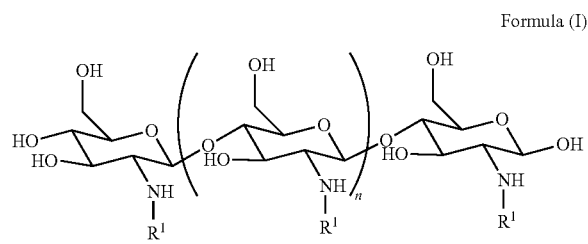

Formula (I)

wherein:

n is an integer between 20 and 6000; and each $R^1$ is independently selected for each occurrence from hydrogen, acetyl, wherein at least 25% of $R^1$ substituents are H, at least 1% of $R^1$ substituents are acetyl, and at least 2% of $R^1$ substituents are Other objects and advantages will become apparent to those skilled in the art from a consideration of the ensuing Detailed Description, Examples, and Claims.

DETAILED DESCRIPTION

Figure 1A:
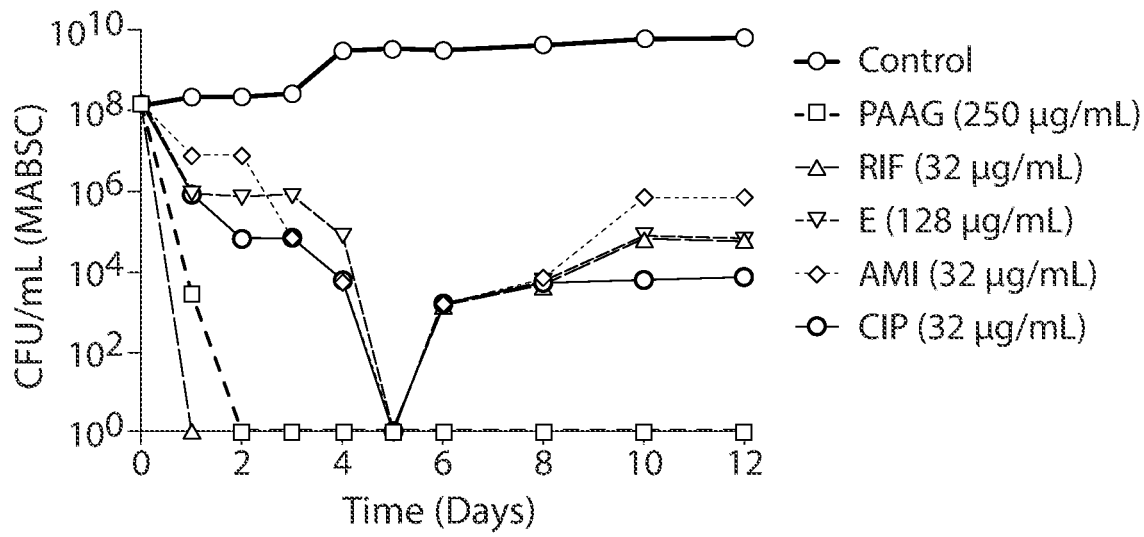
FIG. 1A shows an evaluation of persister formation in nontuberculosis *Mycobacterium abscessus* complex (MABSC) following treatment with standard of care antibiotic or PAAG.

As generally described herein, the present disclosure provides, in part, methods of treating a Nontuberculosis Mycobacteria (NTM) infection (e.g., pulmonary NTM infection (e.g., chronic pulmonary NTM infection or acute pulmonary NTM infection), chronic NTM infection, or acute NTM infection) in a subject in need thereof, the methods comprising administering to the subject an effective amount of a polyglucosamine derivative (e.g., a poly (acetyl, arginyl) glucosamine (PAAG)) described herein.

Definitions

The term "about," as used herein, refers to plus or minus ten percent of the object that "about" modifies.

Disease, disorder, and condition are used interchangeably herein.

As used herein, and unless otherwise specified, the terms "treat," "treating" and "treatment" contemplate an action that occurs while a subject is suffering from the specified disease, disorder or condition, which reduces the severity of the disease, disorder or condition, or retards or slows the progression of the disease, disorder or condition (also, "therapeutic treatment").

"Prophylactic treatment" contemplates an action that occurs before a subject begins to suffer from the specified disease, disorder or condition.

In general, the "effective amount" of a compound refers to an amount sufficient to elicit the desired biological response. As will be appreciated by those of ordinary skill in this art, the effective amount of a compound of the invention may vary depending on such factors as the desired biological endpoint, the pharmacokinetics of the compound, the disease being treated, the mode of administration, and the age, weight, health, and condition of the subject.

As used herein, and unless otherwise specified, a "therapeutically effective amount" of a compound is an amount sufficient to provide a therapeutic benefit in the treatment of a disease, disorder or condition, or to delay or minimize one or more symptoms associated with the disease, disorder or condition. A therapeutically effective amount of a compound means an amount of therapeutic agent, alone or in combination with other therapies, which provides a therapeutic benefit in the treatment of the disease, disorder or condition. The term "therapeutically effective amount" can encompass an amount that improves overall therapy, reduces or avoids symptoms or causes of disease or condition, or enhances the therapeutic efficacy of another therapeutic agent.

In an alternate embodiment, the present invention contemplates administration of the compounds of the present invention or a pharmaceutically acceptable salt or a pharmaceutically acceptable composition thereof, as a prophylactic before a subject begins to suffer from the specified disease, disorder or condition. As used herein, and unless otherwise specified, a "prophylactically effective amount" of a compound is an amount sufficient to prevent a disease, disorder or condition, or one or more symptoms associated with the disease, disorder or condition, or prevent its recurrence. A prophylactically effective amount of a compound means an amount of a therapeutic agent, alone or in combination with other agents, which provides a prophylactic benefit in the prevention of the disease, disorder or condition. The term "prophylactically effective amount" can encompass an amount that improves overall prophylaxis or enhances the prophylactic efficacy of another prophylactic agent.

An "aerosol," as used herein, is a gaseous suspension of liquid particles comprising a polyglucosamine derivative described herein.

A "nebulizer" is a device that converts a liquid into an aerosol of a size that can be inhaled into the respiratory tract. Pneumonic, ultrasonic, electronic nebulizers, e.g., passive electronic mesh nebulizers, active electronic mesh nebulizers and vibrating mesh nebulizers are amenable for use with the invention if the particular nebulizer emits an aerosol with the required properties, and at the required output rate.

The process of pneumatically converting a bulk liquid into small droplets is called atomization. The operation of a pneumatic nebulizer requires a pressurized gas supply as the driving force for liquid atomization. Ultrasonic nebulizers use electricity introduced by a piezoelectric element in the liquid reservoir to convert a liquid into respirable droplets. Various types of nebulizers are described in *Respiratory Care*, Vol. 45, No. 6, pp. 609-622 (2000), the disclosure of which is incorporated herein by reference in its entirety.

As referred to herein and unless specified otherwise, the "molecular weight" of a polyglucosamine derivative described herein refers to the weight averaged molecular weight of a polyglucosamine derivative. In an alternate embodiment, the molecular weight may be presented as number averaged molecular weight or weight averaged molecular weight, wherein the values are related through the polydispersity.

As used herein, the term "detecting" refers to the identification of a component of a microorganism (e.g., an epitope or a particular nucleotide sequence), which thereby determines the presence of the microorganism. It will be further understood that any one strain from the plurality of mycobacteria strains in the sample may be detected independently of any other strain. Also, it will be understood that more than one strain from the plurality of mycobacteria strains can be advantageously detected at the same time, and such, independently of any other strains. The term "detecting" can also refer to staining and microscopy visualization of mycobacteria. Classical fluorescent stains of mycobacteria are for example Ziehl-Nielsen stain or fluorescent Auramine O dye (Kommareddi, S. et al, "Nontuberculous mycobacterial infections: comparison of the fluorescent auramine-O and Ziehl-Neelsen techniques in tissue diagnosis" *Hum. Pathol.* 1984, Vol. 15, No. 11, pp. 1085-9). In some embodiments, it will be understood by one skilled in the art that the step of detecting mycobacteria and particularly NTM strains in a sample can be achieved by immunodetection. For example, the immunodetection can be by an enzyme-linked immunosorbent assay (ELISA) or by any other immunodetection method known to one skilled in the art. In other embodiments, the step of detecting may be achieved by molecular DNA detection which may consist of DNA amplification (e.g., PCR), of nucleic acid hybridization (e.g., Southern blot) or of any other method known by a person skilled in the art.

In some embodiments, an undetectable amount of NTM cells in a sample may include dead NTM cells that do not grow in a culture but are detected by means used to detect microorganisms. In other embodiments, an undetectable amount of NTM cells may refer to about 0 CFU/mL.

Compounds and Compositions

Compounds (e.g., a polyglucosamine derivative described herein) and compositions (e.g., a composition comprising a polyglucosamine derivative described herein) are used in the methods described herein.

Polyglucosamines can be derived from chitin or chitosan. Chitosan is an insoluble polymer derived from the deacetylation of chitin, which is a polymer of N-acetylglucosamine, that the main component of the exoskeletons of crustaceans (e.g., shrimp, crab, lobster). Polyglucosamines are also found in various fungi and arthropods.

A polyglucosamine derivative described herein is generated by functionalizing the free hydroxyl or amine groups with positively charged or neutral moieties. The percent of functionalization is defined as the total percent of monomers on the polyglucosamine backbone that have been functionalized with a positively charged or neutral moiety. The degrees of deacetylation and functionalization impart a specific charge density to the functionalized polyglucosamine derivative. The resulting charge density affects solubility and effectiveness of treatment. Thus, in accordance with the present invention, the degree of deacetylation, the functionalization and the molecular weight must be optimized for optimal efficacy. The polyglucosamine derivatives described herein have a number of properties which are advantageous, including solubility at physiologic (neutral) pH. As used herein, a polycationic functionalized polyglucosamine refers to a polyglucosamine derivative functionalized with positively charged moieties. For example, the polycationic functionalized polyglucosamines may include poly (acetyl, arginyl) glucosamine (PAAG).

In some embodiments, the weight averaged molecular weight of the polyglucosamine derivative (e.g., PAAG) is between 5 and 1,000 kDa. In some embodiments, the weight averaged molecular weight of the polyglucosanine derivative (e.g., PAAG) is between 20 and 150 kDa. In some embodiments, the weight averaged molecular weight of the polyglucosamine derivative (e.g., PAAG) is between 70 and 120 kDa.

The polyglucosamine derivatives described herein (e.g., PAAG) have a range of polydispersity index (PDI) between about 1.0 to about 2.5. As used herein, the polydispersity index (PDI), is a measure of the distribution of molecular weights in a given polymer sample. The PDI calculated is the weight averaged molecular weight divided by the number averaged molecular weight. This calculation indicates the distribution of individual molecular weights in a batch of polymers. The PDI has a value always greater than 1, but as the polymer chains approach uniform chain length, the PDI approaches unity (1). The PDI of a polymer derived from a natural source depends on the natural source (e.g. chitin or chitosan from crab vs. shrimp vs. fungi) and can be affected by a variety of reaction, production, processing, handling, storage and purifying conditions. Methods to determine the polydispersity include, e.g., gel permeation chromatography (also known as size exclusion chromatography); light scattering measurements; and direct calculation from MALDI or from electrospray mass spectrometry. For example, the PDI of a soluble polyglucosamine or a derivatized polyglucosamine described herein is determined by HPLC and multi angle light scattering methods.

Percent functionalization by active derivatization of the amines is determined relative to the total number of monomers on the polyglucosamine polymer. Preferably, the percent functionalization of a derivatized polyglucosamine described herein is determined by H-NMR or quantitative elemental analysis. The degrees of deacetylation and functionalization impart a specific charge density to the functionalized polyglucosamine derivative. The resulting charge density affects solubility, and strength of interaction with tissue, biofilm components and bacterial membranes. The molecular weight is also an important factor in a derivatized polyglucosamine's mucoadhesivity and biofilm disrupting capability. Thus, in accordance with the present invention, these properties must be optimized for optimal efficacy. Exemplary polyglucosamine derivatives are described in U.S. Pat. No. 8,119,780, which is incorporated herein by reference in its entirety.

In some embodiments, the polyglucosamine derivative is of the following structure:

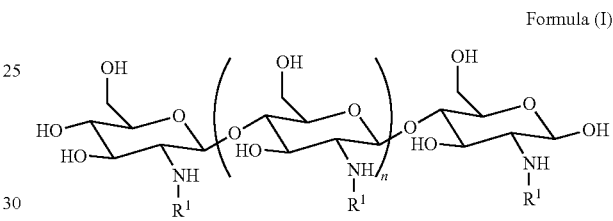

Formula (I)

wherein:

n is an integer between 20 and 6000: and each $R^1$ is independently selected for each occurrence from hydrogen, acetyl, and a group of Formula (II):

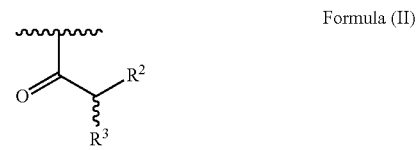

Formula (II)

or $R^1$, when taken together with the nitrogen to which it is attached, forms a guanidine moiety, wherein $R^2$ is hydrogen or amino; and $R^3$ is amino, guanidino, $C_1$-$C_6$ alkyl substituted with an amino or guanidino moiety, or a natural or unnatural amino acid side chain, wherein at least 25% of $R^1$ substituents are H, at least 1% of $R^1$ substituents are acetyl, and at least 2% of $R^1$ substituents are a group of Formula (II).

In some embodiments, between 25-95% of $R^1$ substituents are hydrogen. In some embodiments, between 55-90% of $R^1$ substituents are hydrogen.

In some embodiments, between 1-50% of $R^1$ substituents are acetyl. In some embodiments, between 4-20% of $R^1$ substituents are acetyl.

In some embodiments, between 2-50% of $R^1$ substituents are a group of Formula (II). In some embodiments, between 4-30% of $R^1$ substituents are a group of Formula (II).

In some embodiments, $R^2$ is amino and $R^3$ is an arginine side chain.

In some embodiments, R¹ is selected from one of the following:

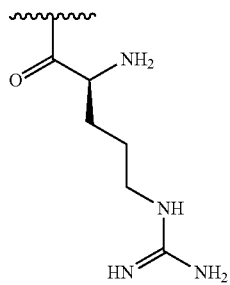 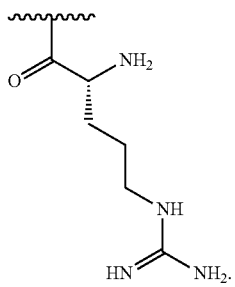

In some embodiments, R² is amino and R³ is a lysine side chain.

In some embodiments, R¹ is selected from one of the following:

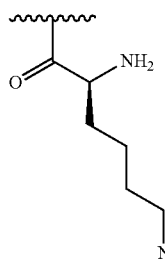 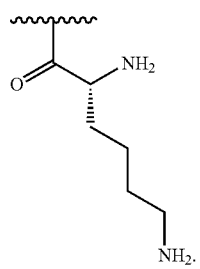

In some embodiments, R² is amino and R³ is a histidine side chain.

In some embodiments, R¹ is selected from one of the following:

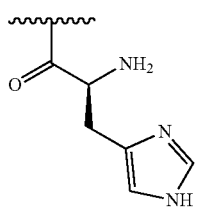 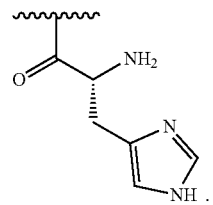

In some embodiments, at least 1% of R¹ substituents are selected from one of the following:

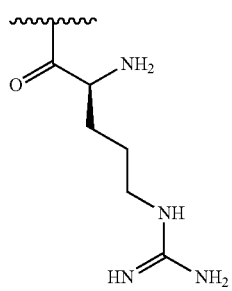 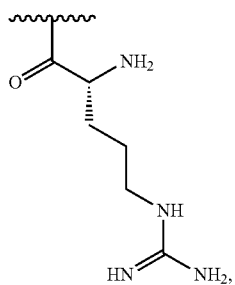

and at least 1% of R¹ substituents are selected from the following:

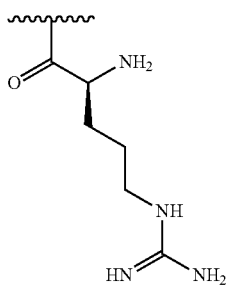 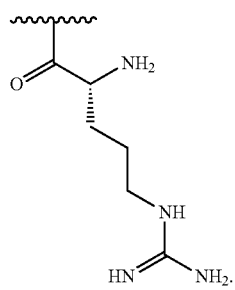

In some embodiments, R² is amino and R³ is a substituted $C_1$-$C_6$ alkyl.

In some embodiments, R³ is $C_1$-$C_6$ alkyl substituted with an amino group. In some embodiments. R³ is $C_1$ alkyl substituted with an amino group. In some embodiments, R³ is $C_2$ alkyl substituted with an amino group. In some embodiments, R³ is $C_3$ alkyl substituted with an amino group. In some embodiments, R is $C_4$ alkyl substituted with an amino group. In some embodiments, R³ is $C_5$ alkyl substituted with an amino group. In some embodiments, R³ is $C_6$ alkyl substituted with an amino group.

In some embodiments, R¹ is selected from one of the following:

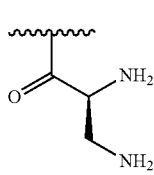 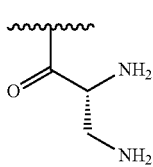 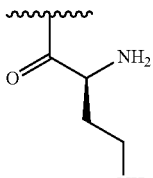

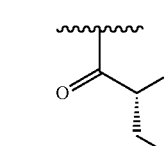 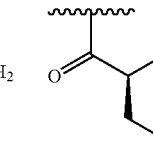 and 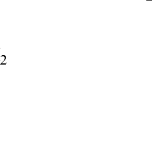

 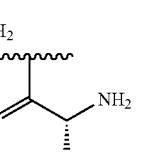 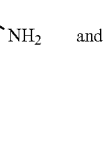

 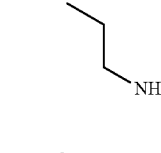 and 

In some embodiments, R³ is $C_1$-$C_6$ alkyl substituted with a guanidino group. In some embodiments, R³ is $C_1$ alkyl substituted with a guanidino group. In some embodiments, R³ is $C_2$ alkyl substituted with a guanidino group. In some embodiments, R³ is $C_3$ alkyl substituted with a guanidino group. In some embodiments, R³ is $C_4$ alkyl substituted with a guanidino group. In some embodiments, R³ is $C_5$ alkyl substituted with a guanidino group. In some embodiments. R is $C_6$ alkyl substituted with a guanidino group.

In some embodiments, $R^1$ is selected from one of the following:

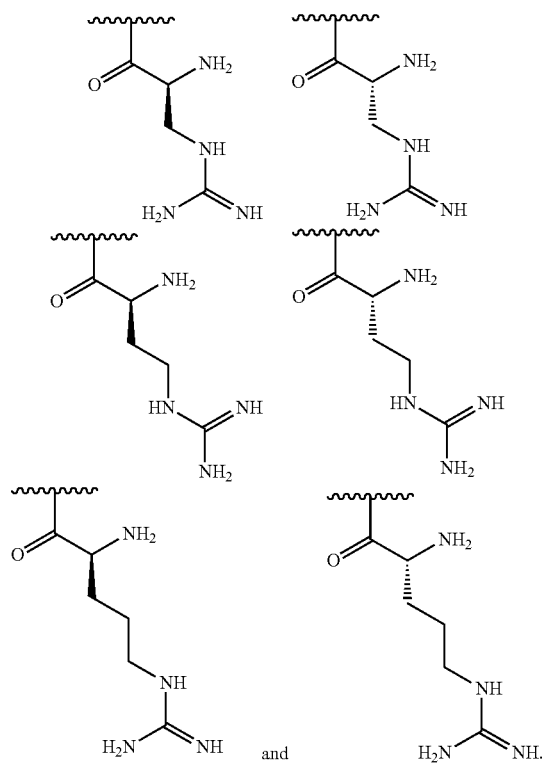

In some embodiments, $R^2$ is amino that is substituted with a nitrogen protecting group prior to substitution on polyglucosamine derivative and removed subsequent to substitution on the polyglucosamine derivative. In some embodiments, the nitrogen protecting group is tert-butyloxycarbonyl (Boc).

In some embodiments, the polyglucosamine derivative is made by reacting a chitosan (e.g., a free amino group of one or more of glucosamine monomers of the chitosan) with an amino acid (e.g., a carboxylic acid moiety of the amino acid) wherein the amino group of the ammo acid is protected by a protecting group (e.g., Boc). The protecting group can be removed. e.g., by exposure to acid of pH<3, after the synthesis.

In some embodiments, in the synthetic process a nitrogen protecting group is used, which can provide an intermediate polymer having a nitrogen protecting group such as Boc.

In some embodiments, $R^2$ is amino.

In some embodiments, $R^2$ is hydrogen and $R^3$ is amino.

In some embodiments, $R^2$ is hydrogen and $R^3$ is guanidino.

In some embodiments, $R^2$ is hydrogen and $R^3$ is a substituted $C_1$-$C_6$alkyl.

In some embodiments, $R^3$ is $C_1$-$C_6$alkyl substituted with an amino group. In some embodiments, $R^3$ is $C_1$ alkyl substituted with an amino group. In some embodiments, $R^3$ is $C_2$ alkyl substituted with an amino group. In some embodiments, $R^3$ is $C_3$ alkyl substituted with an amino group. In some embodiments, $R^3$ is $C_4$ alkyl substituted with an amino group. In some embodiments, $R^3$ is $C_5$ alkyl substituted with an amino group. In some embodiments, $R^3$ is $C_6$ alkyl substituted with an amino group.

In some embodiments $R^1$ is selected from one of the following:

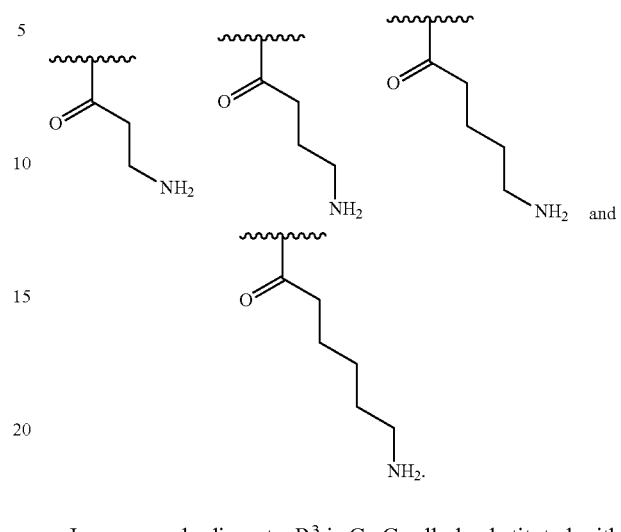

In some embodiments, $R^3$ is $C_1$-$C_6$ alkyl substituted with a guanidino group. In some embodiments, $R^1$ is $C_1$ alkyl substituted with a guanidino group. In some embodiments, $R^1$ is $C_2$ alkyl substituted with a guanidino group. In some embodiments, $R^3$ is $C_3$ alkyl substituted with a guanidino group. In some embodiments, $R^3$ is $C_4$ alkyl substituted with a guanidino group. In some embodiments, $R^3$ is $C_5$ alkyl substituted with a guanidino group. In some embodiments, $R^1$ is $C_6$ alkyl substituted with a guanidino group.

In some embodiments, $R^1$ is selected from one of the following:

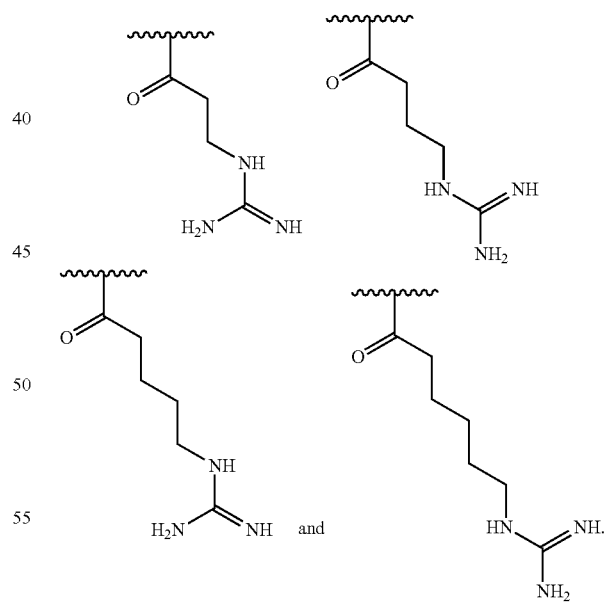

In some embodiments, at least 25% of $R^1$ substituents are H, at least 1% of $R^1$ substituents are acetyl, and at least 2% of $R^1$ substituents independently selected from any of the Formula shown above.

In some embodiments, the polyglucosamine derivative may be further derivatized on the free hydroxyl moieties.

In some embodiments, the polyglucosamine derivative is functionalized at between 5% and 50%, or between 18% and 30%. In some embodiments, the polyglucosamine derivative is functionalized at greater than 18%.

In some embodiments, the polydispersity index (PDI) of the polyglucosamine derivative is between 1.0 and 2.5. In some embodiments, the polydispersity index (PDI) of the polyglucosamine derivative is between 1.5 and 2.0.

In some embodiments, the polyglucosamine derivative is substantially free of other impurities, e.g., salt, e.g., NaCl.

In some embodiments, the polyglucosamine derivative is a polyglucosamine-arginine compound, where the arginine is bound through a peptide (amide) bond via its carbonyl to the primary amine on the glucosamines of polyglucosamine:

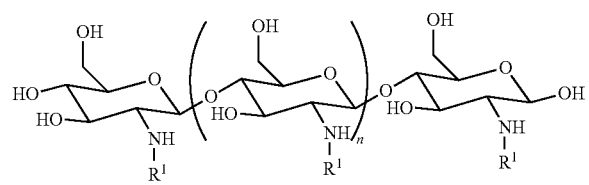

wherein each $R^1$ is independently selected from hydrogen, acetyl, and a group of the following formula:

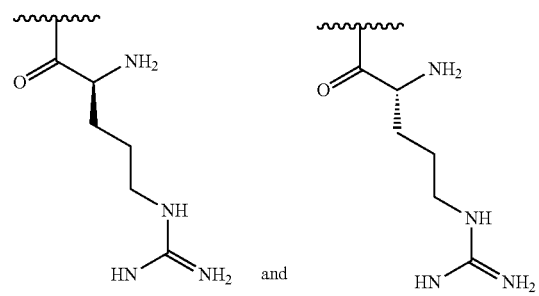 [SMILES: *C(=O)[C@@H](N)CCCNC(=N)N ; *C(=O)[C@H](N)CCCNC(=N)N]

or a racemic mixture thereof, wherein at least 25% of $R^1$ substituents are H, at least 1% are acetyl, and at least 2% are a group of the Formula shown above.

In some embodiments, a polyglucosamine-arginine compound is of the following formula:

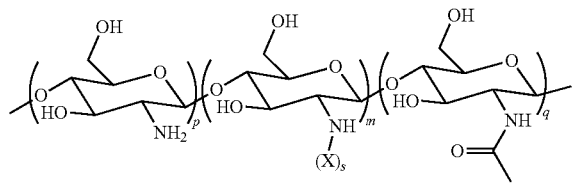

where m is 0.02-0.50; q is 0.50-0.01: s is 1: p+q+m=1; the percent degree of functionalization is m·100%: and X is selected from the group consisting of:

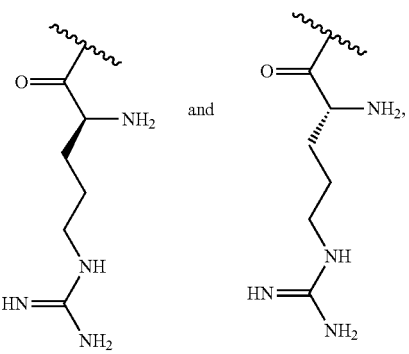 [SMILES: *C(=O)[C@@H](N)CCCNC(=N)N ; *C(=O)[C@H](N)CCCNC(=N)N]

wherein the preparation is substantially free of compounds having a molecular weight of less than 5 kDa. In some embodiments, polyglucosamine-arginine compound is poly (acetyl, arginyl) glucosamine (PAAG).

In some embodiments, the polyglucosamine derivative described herein (e.g., PAAG) is solubilized in an aqueous solution comprising a non-ionic or neutral osmol agent, e.g., glycerol (also known as glycerin). Other neutral osmol agents include a non-fermentable sugar, neutral sugars or alcohols (e.g., erythritol, xylitol, sorbitol, lactose, mannitol), neutral polymers (e.g., polyethylene glycol (PEG), etc. In some embodiments, the polyglucosamine derivative described herein (e.g., PAAG) is solubilized in aqueous solution comprising glycerol between 1-2% v/v. In some embodiments, the polyglucosamine derivative described herein is solubilized in aqueous solution comprising glycerol between 1.2-1.8% v/v. In some embodiments, the polyglucosamine derivative described herein (e.g., PAAG) is solubilized in aqueous solution comprising glycerol between 1.2-1.6% v/v. In some embodiments, the polyglucosamine derivative described herein (e.g., PAAG) is solubilized in aqueous solution comprising glycerol between 1.2-1.6% v/v. In some embodiments the polyglucosamine derivative described herein (e.g., PAAG) is solubilized in aqueous solution comprising glycerol between 1.2-1.4% v/v. In some embodiments, the polyglucosamine derivative described herein (e.g., PAAG) is solubilized in aqueous solution comprising glycerol between 1.3-1.4% v/v. In some embodiments, the polyglucosamine derivative described herein (e.g., PAAG) is solubilized in aqueous solution comprising glycerol about 1.38% v/v. In some embodiments, the solution comprises particles of 1-5 microns in mean particle size diameter. In some embodiments, the solution can be nebulized.

In some embodiments, the compositions (e.g., a composition comprising a polyglucosamine derivative (e.g., PAAG)) described herein may further comprise a non-fermentable sugar (e.g., sorbitol or xylitol). In some embodiments, the combination of a derivatized polyglucosamine (e.g., PAAG) and a non-fermentable sugar (e.g., sorbitol or xylitol) is synergistic. In some embodiments, a non-fermentable sugar (e.g., sorbitol or xylitol) potentiates the biofilm removal activity of a compound as described herein, e.g., a derivatized polyglucosamine (e.g., PAAG). In some embodiments, a non-fermentable sugar (e.g., sorbitol or xylitol) provides osmotic balance to the lungs.

In some embodiments, the polyglucosamine derivative described herein (e.g., PAAG) is solubilized in a saline solution.

The aqueous polyglucosamine derivative (e.g., PAAG) solutions described herein may further comprise a buffer (e.g., a buffer at a pH of between about 3 and about 10 (e.g., between about 5 and about 7). In some embodiments, the pH of the aqueous solution is at or near physiological pH. As used herein, the terms "buffer," "buffer system." or "buffering component" refers to a compound that, usually in combination with at least one other compound, provides a chemical system in solution that exhibits buffering capacity, that is, the capacity to neutralize, within limits, the pH lowering or raising effects of either strong acids or bases (alkali), respectively, with relatively little or no change in the original pH (e.g., the pH before being affected by, e.g., strong acid or base). For example, a buffer described herein maintains or controls the pH of a solution to a certain pH range. For example, "buffering capacity" can refer to the millimoles (mM) of strong acid or base (or respectively, hydrogen or hydroxide ions) required to change the pH by one unit when added to one liter (a standard unit) of the buffer solution. From this definition, it is apparent that the smaller the pH change in a solution caused by the addition of a specified quantity of acid or alkali, the greater the buffer capacity of the solution. See, for example, Remington. The Science and Practice of Pharmacy. Mack Publishing Co., Easton, Pa. ($19^{th}$ Edition, 1995), Chapter 17, pages 225-227. The buffer capacity will depend on the kind and concentration of the buffer components.

Exemplary buffers include, but are not limited to, 4-2-hydroxyethyl-1-piperazineethanesulfonic acid (HEPES), 2-{[tris(hydroxymethyl)methyl]amino}ethanesulfonic acid (TES), 3-(N-morpholino)propanesulfonic acid (MOPS), piperazine-N,N'-bis(2-ethanesulfonic acid) (PIPES), dimethylarsinic acid (cacodylate), citrate (e.g., saline sodium citrate, potassium citrate, ammonium citrate). 2-(N-morpholino)ethanesulfonic acid (MES), phosphate (e.g., PBS, D-PBS), succinate (i.e., 2(R)-2-(methylamino)succinic acid), acetate, dimethylglutarate, maleate, imidazole, N-(2-Acetamido)-2-aminoethanesulfonic acid (ACES), N,N-bis(2-hydroxyethyl)-2-aminoethanesulfonic acid (BES), Bicine, Bis-Tris, Borate, N-cyclohexyl-3-aminopropanesulfonic acid (CAPS), Glycine, 3-[4-(2-Hydroxyethyl)-1-piperazinyl]propanesulfonic acid (HEPPS or EPPS). N-[Tris(hydroxymethyl)methyl]-3-aminopropanesulfonic acid, [(2-Hydroxy-1,1-bis(hydroxymethyl)ethyl)amino]-1-propanesulfonic acid (TAPS), Tricine, Tris, Tris Base, Tris Buffer, Tris-Glycine, Tris-HCl, collidine, veronal acetate, N-(2-Acetamido)iminodiacetic acid: N-(Carbamoylmethyl)iminodiacetic acid (ADA), β-Hydroxy-4-morpholinepropanesulfonic acid, 3-Morpholino-2-hydroxypropanesulfonic acid (MOPSO), cholamine chloride, 3-(N,N-Bis[2-hydroxyethyl]amino)-2-hydroxypropanesulfonic acid (DIPSO), acetamidoglycine, 3-{[1,3-Dihvdroxy-2-(hydroxymethyl)-2-propanyl]amino}-2-hydroxy-1-propanesulfonic acid (TAPSO), Piperazine-N,N'-bis(2-hydroxypropanesulfonic acid) (POPSO), N-(2-Hydroxyethyl)piperazine-N'-(2-hydroxypropanesulfonic acid) (HEPPSO), N-cycloxhexyl-2-aminoethanesulfonic acid (CHES), 2-amino-methyl-1,3-proponediol (AMPd), and glycinamide.

In some embodiments, the buffer comprises a monoprotic acid. In some embodiments, the buffer comprises a polyprotic acid. In some embodiments, the buffer is a solution of one or more substances (e.g., a salt of a weak acid and a weak base; a mixture of a weak acid and a salt of the weak acid with a strong base).

In some embodiments, the buffer is present at a concentration of about 0.01, 0.05, 0.1, 0, 5, 1, 5, 10, 20, 50, 100, 200, 250, 500 mM or more. In some embodiments, the buffer is present at a concentration of about 1 to about 1000 mM.

Persistence

'Persistence' is the ability of a subpopulation of a clonal bacterial population to survive exposure to high concentrations of an antibiotic (Gefen O et al, *FEMS Microbiol. Rev.* 2009, 33, 704-717). Persistence is typically observed when the majority of the bacterial population is rapidly killed while a subpopulation persists for a much longer period of time, despite the population being clonal. The resulting time-kill curve will be biphasic (Balaban N. Q., et al. *Science* 2004, 305, 1622-1625), owing to the heterogeneous response of persistent and non-persistent subpopulations.

Persisters or persister cells are a subpopulation of transiently antibiotic-tolerant bacterial cells that are often slow-growing or growth-arrested, and are able to resume growth after a lethal stress. The presence of persister cells is considered to result in the recalcitrance and relapse of persistent bacterial infections, and it has been linked to an increase in the risk of the emergence of antibiotic resistance during treatment. Persisters may cause antibiotic treatment failure, are selected for following repeated doses of antibiotics and have been shown to lead to the emergence of antibiotic resistance (Fisher R. A. et al *Nature Reviews* 2017, 15, 453-464).

"Persistence" as used herein refers to a latent or dormant state in a subpopulation of the bacteria under which no growth occurs until the stress is removed and the bacteria reactivate. "Resistance" as used herein refers to the ability to grow under antibiotic-induced stress at the bacteria's normal rate through genetically encoded variations.

"Tolerance" as used herein refers to the ability of the bacteria to grow slowly under antibiotic stress.

"Persister cells" as used herein refers to pathogenic bacteria that neither grow nor die in the presence of microbicidal antibiotics (with the exception of PAAG or a combination of PAAG and an antibiotic as described herein). In some embodiments, persister cells contribute to the recalcitrance of clinical infections in cystic fibrosis, tuberculosis, and wounds. In certain embodiments the disclosure includes eradicating the number of persister cells in a population of persister cells, or eradicating an entire population of persister cells. The population of persister cells can be present in an infection, or in a liquid culture, or on an inanimate surface. In non-limiting examples the surface can be a non-porous surface or a surface in a hospital. Additional environments are described herein.

In some embodiments, the persister cells that are eradicated according to the present disclosure are responsible for or are positively correlated with the presence of recalcitrant infections, such as chronic recalcitrant infections. For example, as is well known in the art, when the functioning of an individual's immune system is less than optimal, an infection can become chronic. Known examples of chronic infection occur in a variety of individuals, such as those who are immunocompromised because of immunosuppressive drug courses, co-infection with viruses, or individuals who have an infection that forms a biofilm. As is also well known in the art, biofilms impede access of immune cells and immunological signaling molecules to bacteria, and thus limit the effectiveness of even normally functioning immune systems. Further, biofilms are known to form in a variety of wounds inside the body, as well as on surfaces of indwelling medical devices. In certain instances, such infections and biofilms can be populated by drug-resistant bacteria present on the devices, and in the tissue that comes into contact with them. However, in many instances chronic and recalcitrant infections arise because comparatively slow-growing bacteria develop into drug-tolerant persister cells that are difficult to eradicate with currently used antibiotics, and this can occur with or without the presence of an implanted device. Thus, upon cessation of a course of antibiotics and the subsequent decrease in its concentration, persister cells can exploit an opportunity to grow and repopulate the infection and/or biofilm. The methods of the present disclosure are particularly suited for reducing the number of and/or eradicating such cells.

Methods of Use

Polyglucosamine derivatives as described herein are useful for treating a Nontuberculosis Mycobacteria (NTM) infection in a subject in need thereof.

Thus, in one aspect, provided herein is a method of treating a pulmonary nontuberculosis mycobacteria (NTM) infection (e.g., chronic or acute pulmonary NTM infection) in a subject in need thereof, the method comprising administering to the subject an effective amount of a poly(acetyl, arginyl) glucosamine (PAAG) comprising the following Formula (I):

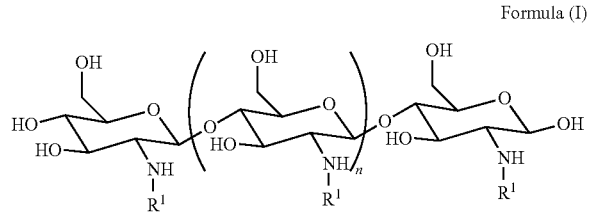

Formula (I)

wherein:

n is an integer between 20 and 6000; and each R¹ is independently selected for each occurrence from hydrogen, acetyl,

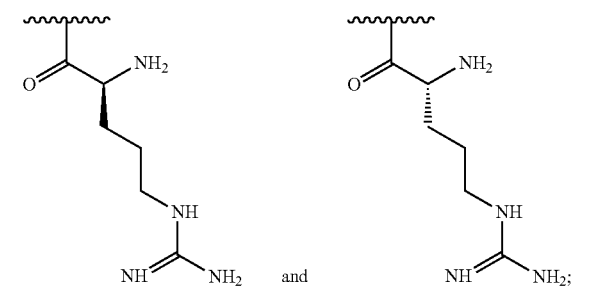 [SMILES: *C(=O)[C@@H](N)CCCNC(=N)N ; *C(=O)[C@H](N)CCCNC(=N)N]

wherein at least 25% of R¹ substituents are H, at least 1% of R substituents are acetyl, and at least 2% of R¹ substituents are

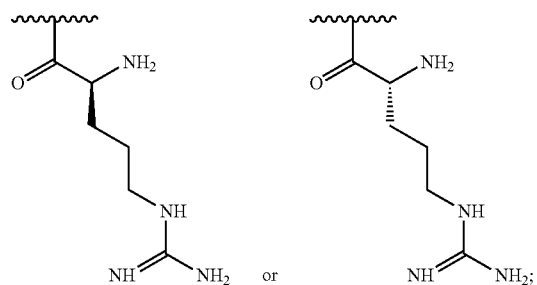 [SMILES: *C(=O)[C@@H](N)CCCNC(=N)N ; *C(=O)[C@H](N)CCCNC(=N)N]

wherein the treatment comprises achieving a negative NTM cell sputum culture of the subject.

In another aspect, provided herein is a method of treating an acute nontuberculosis mycobacteria (NTM) infection in a subject in need thereof, the method comprising administering to the subject an effective amount of a poly(acetyl, arginyl) glucosamine (PAAG) comprising the following Formula (I):

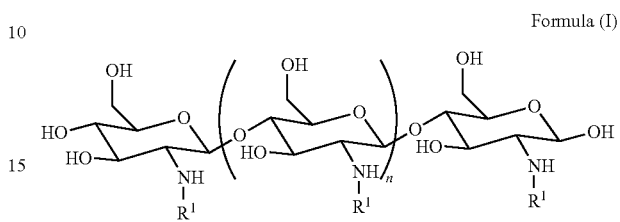

Formula (I)

wherein:

n is an integer between 20 and 6000; and each R¹ is independently selected for each occurrence from hydrogen, acetyl,

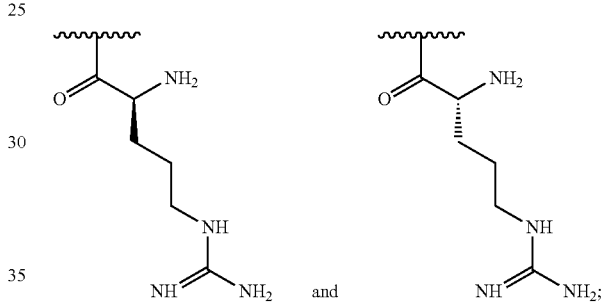

wherein at least 25% of R¹ substituents are H, at least 1% of R¹ substituents are acetyl, and at least 2% of R¹ substituents are

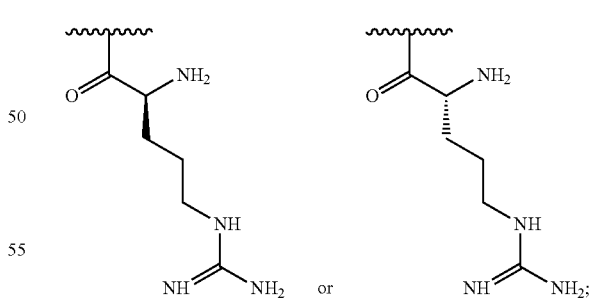

wherein the treatment comprises achieving a negative NTM cell sputum culture of the subject.

In another aspect, provided herein is a method of treating a chronic nontuberculosis mycobacteria (NTM) infection in a subject in need thereof, the method comprising administering to the subject an effective amount of a poly(acetyl, arginyl) glucosamine (PAAG) comprising the following Formula (I):

Formula (I)

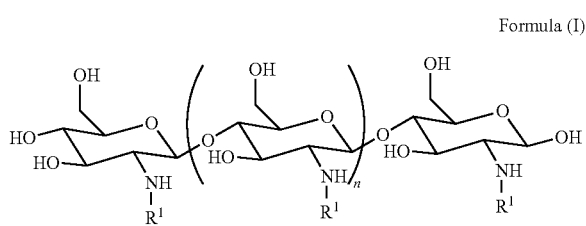

wherein:

n is an integer between 20 and 6000; and each $R^1$ is independently selected for each occurrence from hydrogen, acetyl,

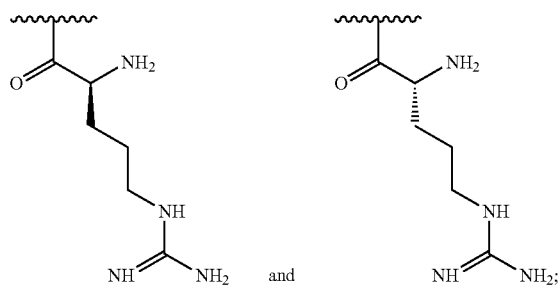 [SMILES: *C(=O)[C@@H](N)CCCNC(=N)N ; *C(=O)[C@H](N)CCCNC(=N)N]

wherein at least 25% of $R^1$ substituents are H, at least 1% of $R^1$ substituents are acetyl, and at least 2% of $R^1$ substituents are

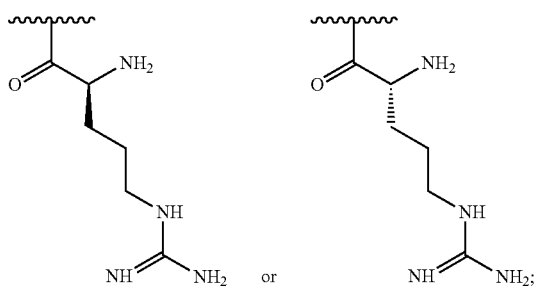 [SMILES: *C(=O)[C@@H](N)CCCNC(=N)N ; *C(=O)[C@H](N)CCCNC(=N)N]

wherein the treatment comprises achieving a negative NTM cell sputum culture of the subject.

In some embodiments of the methods described herein, the NTM cell sputum culture remains negative for at least about 1 month, 3 months, 6 months, 12 months, or 24 months after administering the PAAG to the subject. In some embodiments, the NTM cell is NTM persister cells, NTM cells in stationary growth phase, slow growing NTM cells, or rapidly growing NTM cells, or a combination thereof. For example, the NTM cells may be NTM persister cells.

In some embodiments, the NTM infection is caused by bacteria selected from the group consisting of *Myobacterium avium* complex (MAC), *Mycobacterium abscessus* complex (MABSC), *Mycobacterium gordonae*, and *Mycobacterium intracellular*, or a combination thereof.

In some embodiments, the method comprises disrupting a biofilm caused by the NTM infection. In some embodiments, the method comprises disrupting or removing a biofilm comprising NTM cells. In some embodiments, the method comprises disrupting or removing a biofilm comprising persister NTM cells.

In some embodiments, the method comprises disrupting the bacterial cell walls of NTM cells.

In some embodiments, the method comprises disrupting mucus comprising a biofilm caused by the NTM infection. For example, the disrupting reduces adhesion of the mucus to epithelia (e.g., pulmonary epithelia). In some embodiments, the method comprises disrupting or removing mucus comprising NTM cells. In some embodiments, the method comprises disrupting or removing mucus comprising persister NTM cells.

In some embodiments, the method comprises inhibiting regrowth of a biofilm comprising NTM.

In some embodiments, the method comprises preventing or inhibiting growth of persister NTM cells.

In some embodiments, the method comprises reducing inflammation resulting from NTM infection.

In some embodiments, the method comprises reducing inflammation resulting from persister NTM cells.

In some embodiments, the NTM cells are present in the subject's respiratory system.

In some embodiments, the subject has a lung disease, cystic fibrosis (CF), chronic pulmonary disorder, primary ciliary dyskinesia, or non-CF bronchiectasis.

In some embodiments, the subject has been previously administered an NTM therapy.

In some embodiments, the subject is unresponsive to a previously administered NTM therapy.

In some embodiments, the subject is concurrently administered a second NTM therapy.

In some embodiments, the NTM therapy is an antibiotic. For example, the antibiotic is rifampicin, aztreonam, ethambutol, amikacin, azithromycin, or clarithromycin, or a combination thereof.

In some embodiments, the administration of the PAAG and the second NTM therapy is synergistic. In some embodiments, the effect of administration of the PAAG and the second NTM therapy is additive.

In some embodiments, the methods further comprises administering to the subject an additional therapeutic agent. For example, the additional therapeutic agent is selected from the group consisting of an antibiotic agent, an anti-inflammatory agent, and a vasodilator, or a combination thereof. In some embodiments, the additional therapeutic agent is orally administered to the subject. In some embodiments, the additional therapeutic agent is administered to the subject by inhalation. In some embodiments, the additional therapeutic agent is administered to the subject intravenously.

In some embodiments, the PAAG is administered to the subject prior to administration of the additional therapeutic agent. In some embodiments, the PAAG is administered to the subject concurrently with administration of the additional therapeutic agent. In some embodiments, the PAAG is administered to the subject subsequent to administration of the additional therapeutic agent.

In some embodiments, the treatment comprises achieving NTM cell sputum conversion in the subject, wherein the NTM cell sputum conversion comprises at least three consecutive negative NTM cell sputum cultures.

In another aspect, provided herein is a method of treating a pulmonary nontuberculosis mycobacteria (NTM) infection (e.g., chronic or acute pulmonary NTM infection) in a subject in need thereof, the method comprising administering to the subject an effective amount of a poly(acetyl, arginyl) glucosamine (PAAG) comprising the following Formula (I):

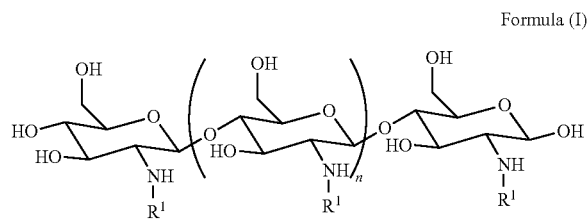
Formula (I)

wherein:

n is an integer between 20 and 6000; and each R¹ is independently selected for each occurrence from hydrogen, acetyl,

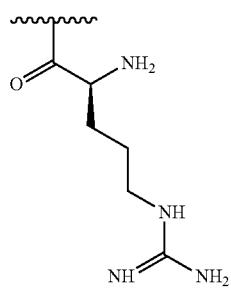 and 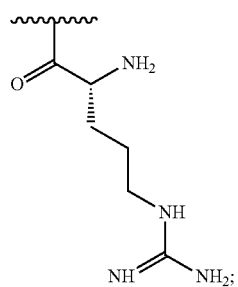

wherein at least 25% of R¹ substituents are H, at least 1% of R¹ substituents are acetyl, and at least 2% of R¹ substituents are

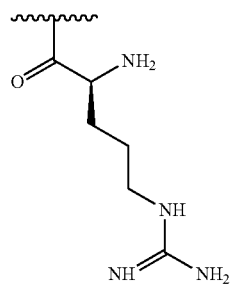 or 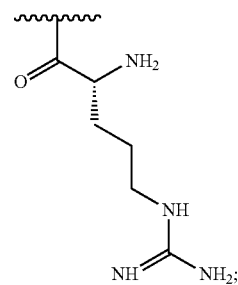

wherein the treatment results in an undetectable amount of NTM cells in the subject.

In another aspect, provided herein is a method of treating an acute nontuberculosis mycobacteria (NTM) infection in a subject in need thereof, the method comprising administering to the subject an effective amount of a poly(acetyl, arginyl) glucosamine (PAAG) comprising the following Formula (I):

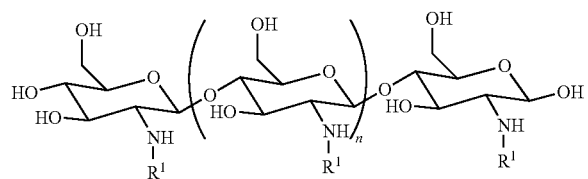
Formula (I)

wherein:

n is an integer between 20 and 6000; and each R¹ is independently selected for each occurrence from hydrogen, acetyl,

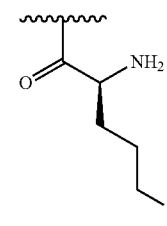 and 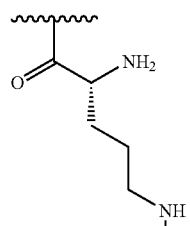

wherein at least 25% of R¹ substituents are H, at least 1% of R¹ substituents are acetyl, and at least 2% of R¹ substituents are

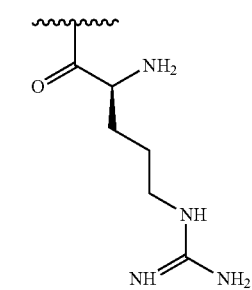 or 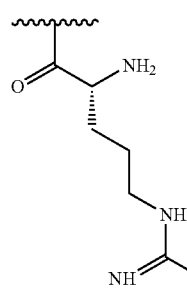

wherein the treatment results in an undetectable amount of NTM cells in the subject.

In another aspect, provided herein is a method of treating a chronic nontuberculosis mycobacteria (NTM) infection in a subject in need thereof, the method comprising administering to the subject an effective amount of a poly(acetyl, arginyl) glucosamine (PAAG) comprising the following Formula (I):

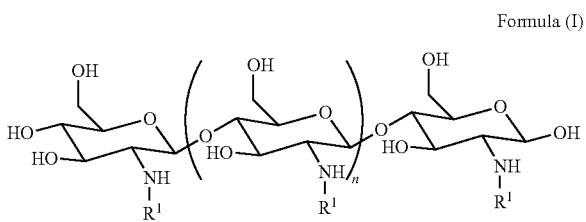
Formula (I)

wherein:

n is an integer between 20 and 6000; and each R¹ is independently selected for each occurrence from hydrogen, acetyl,

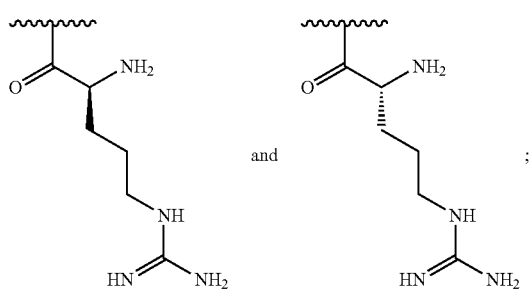

wherein at least 25% of $R^1$ substituents are H, at least 1% of $R^1$ substituents are acetyl, and at least 2% of $R^1$ substituents are

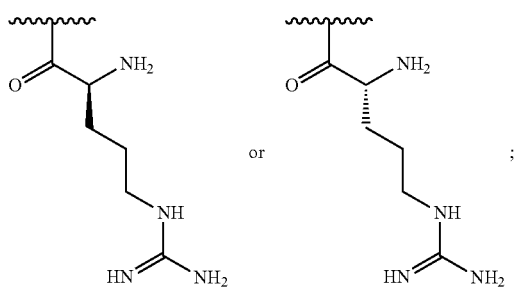 [SMILES: *C(=O)[C@@H](N)CCCNC(=N)N ; *C(=O)[C@H](N)CCCNC(=N)N]

wherein the treatment results in an undetectable amount of NTM cells in the subject.

In some embodiments of the methods described herein, the amount of NTM cells remains undetectable for at least about 1 month, 3 months, 6 months, 12 months, or 24 months after administering the PAAG to the subject.

In some embodiments, the NTM cell is NTM persister cells, NTM cells in stationary growth phase, slow growing NTM cells, or rapidly growing NTM cells, or a combination thereof. For example, the NTM cells may be NTM persister cells.

In some embodiments, the NTM infection is caused by bacteria selected from the group consisting of *Mycobacterium avium* complex (MAC), *Mycobacterium abscessus* complex (MABSC), *Mycobacterium gordonae*, and *Mycobacterium intracellular*, or a combination thereof.

In some embodiments, the method comprises disrupting a biofilm caused by the NTM infection. In some embodiments, the method comprises disrupting or removing a biofilm comprising NTM cells. In some embodiments, the method comprises disrupting or removing a biofilm comprising persister NTM cells.

In some embodiments, the method comprises disrupting mucus comprising a biofilm caused by the NTM infection. For example, the disrupting reduces adhesion of the mucus to epithelia (e.g., pulmonary epithelia). In some embodiments, the method comprises disrupting or removing mucus comprising NTM cells. In some embodiments, the method comprises disrupting or removing mucus comprising persister NTM cells.

In some embodiments, the method comprises inhibiting regrowth of a biofilm comprising NTM.

In some embodiments, the method comprises preventing or inhibiting growth of persister NTM cells.

In some embodiments, the method comprises reducing inflammation resulting from NTM infection.

In some embodiments, the method comprises reducing inflammation resulting from persister NTM cells.

In some embodiments, the NTM cells are present in the subject's respiratory system.

In some embodiments, the subject has a lung disease, cystic fibrosis (CF), chronic pulmonary disorder, primary ciliary dyskinesia, or non-CF bronchiectasis.

In some embodiments, the subject has been previously administered an NTM therapy.

In some embodiments, the subject is unresponsive to a previously administered NTM therapy.

In some embodiments, the subject is concurrently administered a second NTM therapy.

In some embodiments, the NTM therapy is an antibiotic. For example, the antibiotic is rifampicin, aztreonam, ethambutol, amikacin, azithromycin, or clarithromycin, or a combination thereof.

In some embodiments, the administration of the PAAG and the second NTM therapy is synergistic. In some embodiments, the effect of administration of the PAAG and the second NTM therapy is additive.

In some embodiments, the methods further comprises administering to the subject an additional therapeutic agent. For example, the additional therapeutic agent is selected from the group consisting of an antibiotic agent, an anti-inflammatory agent, and a vasodilator, or a combination thereof. In some embodiments, the additional therapeutic agent is orally administered to the subject. In some embodiments, the additional therapeutic agent is administered to the subject by inhalation. In some embodiments, the additional therapeutic agent is administered to the subject intravenously.

In some embodiments, the PAAG is administered to the subject prior to administration of the additional therapeutic agent. In some embodiments, the PAAG is administered to the subject concurrently with administration of the additional therapeutic agent. In some embodiments, the PAAG is administered to the subject subsequent to administration of the additional.

In some embodiments of the methods described herein, administering refers to delivering a composition comprising the PAAG. For example, the composition may be a dry powder (e.g., powder is a vacuum-dried, freeze-dried, or spray-dried powder). In some other embodiments, the composition is an aqueous composition. In some embodiments, the aqueous composition further comprises a neutral osmol agent (e.g., glycerol, sorbitol, mannitol, xylitol, and erythritol) In some embodiments, the composition is a nebulized composition.

In some embodiments of the methods described herein, the composition is configured for inhaled administration. In some embodiments, the composition is administered to the lungs of the subject. In some embodiments, the composition in administered to the subject by a nebulizer, an insufflator, an inhaler, or a puffer.

In some embodiments of the methods described herein, the composition is administered once daily. In some embodiments, the composition is administered twice daily. In some embodiments, the composition is administered once a week. In some embodiments, the composition is administered twice a week.

In some embodiments of the methods described herein, the PAAG is at a concentration of from about 50 μg/mL to about 500 μg/mL in the composition. In some embodiments, the PAAG is at a concentration of from about 100 μg/mL to about 300 μg/mL in the composition. In some embodiments, the PAAG is at a concentration of from about 200 μg/mL to about 300 μg/mL in the composition. In some embodiments, the PAAG is at a concentration of about 250 μg/mL in the composition.

In some embodiments of the methods described herein, the composition administered to subject to provide a dosage of from about 0.1 mg to about 20 mg of PAAG. In some embodiments, the composition administered to subject to provide a dosage of from about 0.5 mg to about 10 mg of PAAG. In some embodiments, the composition administered to subject to provide a dosage of from about 1 mg to about 5 mg of PAAG.

In another aspect, provided herein is a method of eradicating an entire population of nontuberculosis mycobacteria (NTM) cells in an environment selected from the group consisting of a subject, a sample, a biofilm, a surface, and a medical device, the method comprising administering to the environment an effective amount of a poly(acetyl, arginyl) glucosamine (PAAG) comprising the following formula comprising the following Formula (I):

Formula (I)

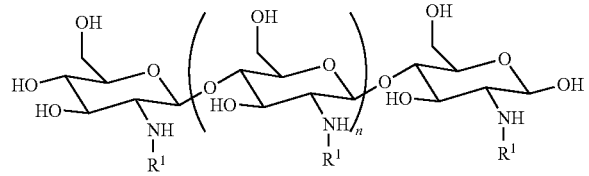

wherein:

n is an integer between 20 and 6000; and each $R^1$ is independently selected for each occurrence from hydrogen, acetyl,

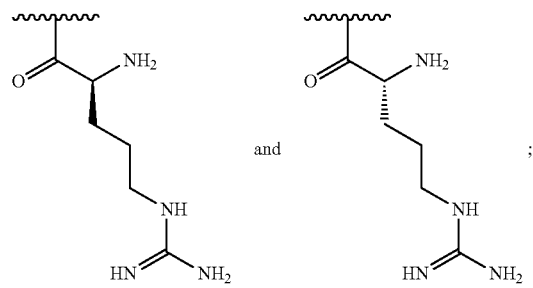 [SMILES: *C(=O)[C@@H](N)CCCNC(=N)N ; *C(=O)[C@H](N)CCCNC(=N)N]

wherein at least 25% of $R^1$ substituents are H, at least 1% of $R^1$ substituents are acetyl, and at least 2% of $R^1$ substituents are

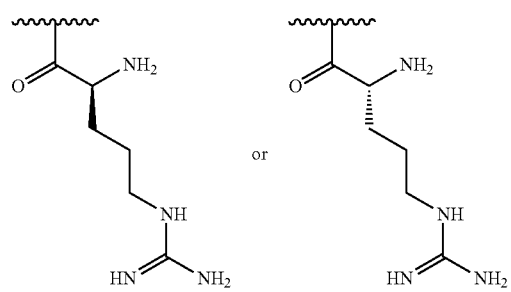

For example, the environment is a biofilm caused by NTM infection. In some embodiments, method comprises disrupting the biofilm caused by NTM infection. In some embodiments, the method comprises inhibiting regrowth of a biofilm of NTM. In some embodiments, a second NTM therapy is administered to the environment. For example, the second NTM therapy is an antibiotic (e.g., rifampicin, aztreonam, ethambutol, amikacin, azithromycin, or clarithromycin, or a combination thereof). In some embodiments, the administration of PAAG and the second NTM therapy is synergistic. In some embodiments, the effect of administration of the PAAG and the second NTM therapy is additive.

In some embodiments of the methods described above, the weight averaged molecular weight of the PAAG is from about 5 to about 1000 kDa. In some embodiments, the weight averaged molecular weight of the PAAG is from about 20 to about 150 kDa. In some embodiments, the weight averaged molecular weight of the PAAG is from about 70 to about 120 kDa.

In some embodiments of the methods described above, the PAAG is arginine functionalized from about 18 to about 30% of the total number of monomers on the glucosamine backbone. In some embodiments, the PAAG is arginine functionalized greater than 18% of the total number of monomers on the glucosamine backbone.

In some embodiments of the methods described above, the PAAG has a polydispersity index of from about 1.0 to about 2.5.

In some embodiments of the methods described above, about 1 to about 50% of $R^1$ is acetyl. In some embodiments, about 4 to about 20% of $R^1$ is acetyl.

The therapeutic response can be any response that a user (e.g., a clinician) will recognize as an effective response to the therapy. The therapeutic response will generally be a reduction, inhibition, delay or prevention in growth of or reproduction of one or more NTM species, or the killing of one or more NTM. A therapeutic response may also be reflected in an improvement in pulmonary function, for example forced expiratory volume in one second ($FEV_1$). In some embodiments, where a subject is treated for an NTM infection (e.g., in the lungs), the therapeutic response is measured as the change from baseline on the full semi quantitative scale for mycobacterial culture or an improvement in the distance walked in the 6 minute walk test (6 MWT) or improved pulmonary function as measured by FEV1. It is further within the skill of one of ordinary skill in the art to determine appropriate treatment duration, appropriate doses, and any potential combination treatments, based upon an evaluation of therapeutic response.

In some embodiments, the NTM infection is caused by M. avium, M. avium subsp. hominissuis (MAH). M. abscessus, M. chelonae, M. bolletii, M. kansasii, M. ulcerans, M. avium, M. avium complex (MAC) (M. avium and M. intracellulare), M. conspicuum, M. kansasii, M. peregrinum, M. immunogenum, M. xenopi, M. marinum, M. malmoense, M. marinum, M. mucogenicum, M. nonchromogenicum, M. scrofulaceum, M. simiae, M. smegmatis, M. szulgai, M. terrae, M. terrae complex, M. haemophlum, M. genavense, M. asiaticum, M. shimoidei, M. gordonae, M. nonchromogenicum, M. triplex, M. lentiflavum, M. celatum, M. fortuitum, or M. fortuitum complex (M. fortuitum and M. chelonae), or a combination thereof. In some embodiments, the NTM infection is a recalcitrant NTM infection. In some embodiments, the NTM infection is a chronic, recalcitrant NTM infection. In some embodiments, the NTM infection is an acute NTM infection.

Combination Therapy

In some embodiments, a polyglucosamine derivative or a composition comprising a polyglucosamine derivative as described herein is administered to a subject in need thereof in combination with one or more additional agent, such as an additional therapeutic agent. Administered "in combination", as used herein, means that two (or more) different treatments are delivered to the subject during the course of the subject's affliction with the disorder, e.g., the two or more treatments are delivered after the subject has been diagnosed with the disorder and before the disorder has been cured or eliminated or treatment has ceased for other reasons. In some embodiments, the delivery of one treatment is still occurring when the delivery of the second begins, so that there is overlap in terms of administration. This is sometimes referred to herein as "simultaneous" or "concurrent" administration. In other embodiments, the delivery of one treatment ends before the delivery of the other treatment begins. In some embodiments of either case, the treatment is more effective because of combined administration. For example, the second treatment is more effective, e.g., an equivalent effect is seen with less of the second treatment, or the second treatment reduces symptoms to a greater extent, than would be seen if the second treatment were administered in the absence of the first treatment, or the analogous situation is seen with the first treatment. In some embodiments, delivery is such that the reduction in a symptom, or other parameter related to the disorder is greater than what would be observed with one treatment delivered in the absence of the other. The effect of the two treatments can be partially additive, wholly additive, or greater than additive (synergistic). The delivery can be such that an effect of the first treatment delivered is still detectable when the second is delivered. In some embodiments, the administrations of a combination of agents and therapeutics are spaced sufficiently close together such that a synergistic effect is achieved.

In some embodiments, the combination treatment provides potentiation of one or more compound or agent being administered to the subject. "Potentiation", as used herein, refers to an enhancement of one agent by another so that the combined effect is greater than the sum of the effects of each one alone. For example, a polyglucosamine derivative or a composition comprising a polyglucosamine derivative as described herein can be used in combination with an additional NTM therapy (e.g., an antibiotic agent). The polyglucosamine derivative or a composition comprising a polyglucosamine derivative as described herein can result in potentiation of the additional NTM therapy (e.g., an antibiotic agent), (e.g., enhance the effect of the polyglucosamine derivative or a composition comprising a polyglucosamine derivative or the additional NTM therapy). In some embodiments, the polyglucosamine derivative or a composition comprising a polyglucosamine derivative can result in potentiation of the additional NTM therapy, so that the treatment effect of the combination in the methods described herein is greater than either the polyglucosamine derivative or a composition comprising a polyglucosamine derivative alone or the additional NTM therapy alone. In some embodiments, the combinations of a polyglucosamine derivative or a composition comprising a polyglucosamine derivative and an additional NTM therapy can also result in a synergistic effect.

In some embodiments, the additional therapeutic agent is an antibiotic agent. General classes of antibiotics include, e.g., aminoglycosides, bacitracin, beta-lactam antibiotics, cephalosporins, chloramphenicol, glycopeptides, macrolides, lincosamides, penicillins, quinolones, rifampin, glycopeptide, tetracyclines, trimethoprim and sulfonamides.

Exemplary antibiotic agents include, but are not limited to the following. Exemplary aminoglycosides include streptomycin, neomycin, framycetin, parpmycin, ribostamycin, kanamycin, amikacin, dibekacin, tobramycin, hygromycin b, spectinomycin, gentamicin, netilmicin, sisomicin, isepamicin, verdamicin, amikin, garamycin, kantrex, netromycin, nebcin, and humatin. exemplary carbacephems include loracarbef (lorabid). exemplary carbapenems include ertapenem, invanz, doripenem, finibax, imipenem/cilastatin, primaxin, meropenem, and merrem. exemplary cephalosporins include cefadroxil, durisef, cefazolin, ancef, cefalotin, cefalothin, keflin, cefalexin, keflex, cefaclor, ceclor, cefamandole, mandole, cefoxitin, mefoxin, cefprozill, cefzil, cefuroxime, ceftin, zinnat, cefixime, suprax, cefdinir, omnicef, cefditoren, spectracef, cefoperazone, cefobid, cefotaxime, claforan, cefpodoxime, fortaz, ceftibuten, cedax, ceftizoxime, ceftriaxone, rocephin, cefepime, maxipime, and ceftrobriprole. exemplary glycopeptides include dalbavancin, oritavancin, teicoplanin, vancomycin, and vancocin. exemplary macrolides include azithromycin, sithromax, surnamed, zitrocin, clarithromycin, biaxin, dirithromycin, erythromycin, erythocin, erythroped, roxithromycin, troleandomycin, telithromycin, ketek, and spectinomycin. exemplary monobactams include aztreonam. exemplary penicillins include amoxicillin, novamox, aoxil, ampicillin, alocillin, carbenicillin, coxacillin, diloxacillin, flucloxacillin floxapen, mezlocillin, methicillin, nafcillin, oxacillin, penicillin, and ticarcillin. exemplary polypeptides include bacitracin, colistin, and polymyxin b. exemplary quiniolones include ciproflaxcin, cipro, ciproxin, ciprobay, enoxacin. gatifloxacin, tequin, levofloxacin. levaquin, lomefloxacin, moxifloxacin, avelox, norfloxacin, noroxin, ofloxacin, ocuflox, trovafloxacin, and trovan. exemplary sulfonamides include mefenide, prontosil (archaic), sulfacetamide, sulfamethizole, sulfanilamide (archaic), sulfasalazine, sulfisoxazole, trimethoprim, trimethoprim-sulfamethoxazole (co-trimoxazole), and bactrim, exemplary tetracyclines include demeclocyline, doxycycline, vibramycin, minocycline, minocin, oxytetracycline, terracin, tetracycline, and sumycin, other exemplary antibiotics include salvarsan, chloamphenicol, chloromycetin, clindamycin, cleocin, linomycin, ethambutol, fosfomycin, fusidic acid, fucidin, furazolidone, isoniazid, linezolid, zyvox, metronidazole, flagyl, mupirocin, bactroban, nitroiurantion, macrodantin, macrobid, platensimycin, pyrazinamide, quinupristin/dalfopristin (syncerid), rifampin (rifampicin), and tinidazole, or a combination thereof.

In some embodiments, the antibiotic agent is imipenem, cefoxitin, streptomycin, rifampicin, ciprofloxacin, colistin, aztreonam, ethambutol, amikacin, azithromycin, or clarithromycin, or a combination thereof.

In some embodiments, the additional therapeutic agent is an anti-inflammatory agent (e.g., steroidal anti-inflammatory drugs and non-steroidal anti-inflammatory drugs (NSAIDs)).

Exemplary steroidal anti-inflammatory drugs include, but are not limited to hydrocortisone, beclomethasone, budenoside, ciclesonide, dexamethasone, flunisolide. fluticasone, methylprednisolone, mometasone, prednisolone, prednisone, triamcinolone, albuterol and ipratropium bromide, fluticasone-salmeterol, budesonide-formoterol, fluticasone-umeclidinium-vilanterol, and fluticasone-vilanterol, mometasone-formoterol, or a combination thereof. In some embodiments, steroidal anti-inflammatory drugs include glucocorticoids (corticosteroids), e.g., Hydrocortisone (Cortisol), Cortisone acetate, Prednisone, Prednisolone, Methylprednisolone, Dexamethasone, Betamethasone, Triamcinolone, Beclometasone, Fludrocortisone acetate, Deoxycorticosterone acetate (DOC A), and Aldosterone Exemplary non-steroidal anti-inflammatory drugs include Aspirin, Choline and magnesium salicylates, Choline salicylate, Celecoxib, Diclofenac potassium, Diclofenac sodium, Diclofenac sodium with Isoprostol, Diflunisal. Etodolac, Fenoprofen calcium, Flurbiprofen, Ibuprofen, Indomethacin, Ketoprofen, Magnesium salicylate, Meclofenamate sodium, Mefenamic acid, Meloxicam. Nabumetone, Naproxen, Naproxen sodium. Oxaprozin, Piroxicam, Rofecoxib, Salsalate, Sodium salicylate, Sulindac, Tolmetin sodium, and Valdecoxib. Exemplary nonsteroidal anti-inflammatory agents (e.g., peptides) include regulatory cytokines, such as interleukins, e.g., IL-1, IL-4, IL-6, IL-10, IL-11, and IL-13.

In some embodiments, the additional therapeutic agent is a vasodilator. Exemplary vasodilators include, but are not limited to oxygen, nitric oxide, nitroprusside. sildenafil, tadalafil, bosentan, iloprost, treprostinil, epoprostenol, treprostinil sodium, selexipag, nifedipine, diltiazem, and hydralazine, or a combination thereof.

In some embodiments, the additional therapeutic agent is administered to the subject by inhalation. In other embodiments, the additional therapeutic agent is orally administered to the subject. In other embodiments, the additional therapeutic agent is administered to the subject intravenously.

In some embodiments, the additional therapeutic agent is a macrolide antibiotic. In a further embodiment, the macrolide antibiotic is azithromycin, clarithromycin, erythromycin, carbomycin A. josamycin, kitamycin, midecamycin, oleandomycin, solithromycin, spiramycin, troleandomycin, tylosin, roxithromycin, or a combination thereof. In a further embodiment, the macrolide antibiotic is administered to the subject orally.

In other embodiments, the additional therapeutic agent is a rifamycin compound. In a further embodiment, the rifammycin is rifampin. In another embodiment, the rifamycin is rifabutin, rifapentine, rifaximin, or a combination thereof.

In yet another embodiment, the additional therapeutic agent is a quinolone. In a further embodiment, the quinolone is a fluoroquinolone. In another embodiment, the quinolone is ciprofloxacin, levofloxacin, gatifloxacin, enoxacin, levofloxacin, ofloxacin, moxifloxacin, trovafloxacin, or a combination thereof.

In some embodiments, the additional therapeutic agent is an aminoglycoside. In a further embodiment, the aminoglycoside is amikacin, apramycin, arbekacin, astromicin, bekanamycin, boholmycin, brulamycin, capreomycin, dibekacin, dactimicin, etimicin, framycetin, gentamicin, H107, hygromycin, hygromycin B, inosanmcin, K-4619, isepamicin, KA-5685, kanamycin, neomycin, netilmicin, paromomycin, plazomicin, ribostamycin, sisomicin, rhodestreptomycin, sorbistin, spectinomycin, sporaricin, streptomycin, tobranmycin, verdamicin, vertilmicin, a pharmaceutically acceptable salt thereof, or a combination thereof. In a further embodiment, the aninoglycoside is administered intravenously or via inhalation.

Methods of Administration

The compounds (e.g., polyglucosamine derivative (e.g., PAAG)) and compositions (e.g., a composition comprising a polyglucosamine derivative (e.g., PAAG)) as described herein can be administered to a subject in a variety of ways. Exemplary methods of administration are described herein.

In some embodiments, the compounds (e.g., polyglucosamine derivative (e.g., PAAG)) and compositions (e.g., a composition comprising a polyglucosamine derivative (e.g., PAAG)) of the present disclosure may be administered by aerosol (e.g., nasal) or inhalation. Such compositions may be prepared as solutions in saline or neutral osmols, employing benzyl alcohol or other suitable preservatives, absorption promoters to enhance bioavailability, and/or other solubilizing or dispersing agents. In some embodiments. the polyglucosamine derivative described herein (e.g., PAAG) is solubilized in an aqueous solution comprising a non-ionic or neutral osmol, e.g., glycerol (also known as glycerin).

The methods and compositions of the described invention may be used in the form of drops or sprays (e.g., a nasal spray, aerosol spray, or pump spray) or other vehicles for inhalation or nasal administration (intranasal delivery). Aerosol spray preparations can be contained in a pressurized container with a suitable propellant such as a hydrocarbon propellant. Pump spray dispensers can dispense a metered dose or a dose having a specific particle or droplet size. Any dispensing device can be arranged to dispense only a single dose, or a multiplicity of doses. More generally, compositions of the invention formulated for inhalation or intranasal administration, can also be provided as dry powders, solutions, suspensions, or viscous compositions. In some embodiments, the compositions of the invention (e.g., compositions of compounds described herein), are provided as solution compositions. In some embodiments, the compositions of the described invention can be delivered by other instruments, e.g., including but not limited to, a nebulizer, an insufflators, an inhaler, or a puffer.

In some embodiments, methods provided herein comprise administration of the compound or composition to the subject via nebulization or aerosolization. The method in this embodiment therefore entails generation of an aerosolized composition comprising a polyglucosamine derivative described herein (e.g., PAAG). In one embodiment, upon nebulization, the aerosolized composition has an aerosol droplet size of about 1 μm to about 4 μm, about 1 μm to 5 μm.

In some embodiments, the methods provided herein comprise administration of the compound or composition to the subject via a nebulizer. The nebulizer provides an aerosol mist of the composition comprising a compound described herein for delivery to the lungs of the patient. Examples of nebulizer include, but is not limited to an electronic mesh nebulizer, pneumonic (jet) nebulizer, ultrasonic nebulizer, breath-enhanced nebulizer, and breath-actuated nebulizer.

In some embodiments, the compounds (e.g., polyglucosamine derivative (e.g., PAAG)) or compositions (e.g., a composition comprising a polyglucosamine derivative (e.g., PAAG)) may be combined with the carrier materials to produce a single dry dosage form for powder or dry powder inhalation. The dry powder may be directly inhaled by allowing inhalation only at the same measured inspiratory flow rate and inspiratory volume for each delivery. In some embodiments, the powder may be dissolved in an aqueous solvent to create a solution to create an aerosol for inhalation.

When the methods using the compounds (e.g., polyglucosamine derivative (e.g., PAAG)) or compositions (e.g., a composition comprising a polyglucosamine derivative (e.g., PAAG)) described herein can include one or more additional therapeutic or prophylactic agents, both the compound and the additional agent should be present at dosage levels of between about 1 to 100%, and more preferably between about 5 to 95% of the dosage normally administered in a monotherapy regimen. The additional agents may be administered separately, as part of a multiple dose regimen, from the compounds of this invention. Alternatively, those agents may be part of a single dosage form, mixed together with the compounds of this invention in a single composition.

The compounds (e.g., polyglucosamine derivative (e.g., PAAG)) can, for example, be administered to the subject by inhalation, with a dosage ranging from about 0.005 to about 100 mg/kg, from about 0.02 to about 100 mg/kg, or from about 0.1 mg to about 10 mg/kg of body weight of the subject. For example, the compounds described herein (e.g., polyglucosamine derivative (e.g., PAAG)) may be administered by inhalation with a dosage ranging from about 0.005 to about 10 mg/kg, from about 0.005 to about 5 mg/kg, from about 0.005 from about 1 mg/kg, from about 0.01 to about 10 mg/kg, from about 0.01 to about 5 mg/kg, form about 0.01 to about 1 mg/kg, or from about 0.01 to about 0.1 mg/kg of body weight of the subject.

In some embodiments, the compounds described herein (e.g., polyglucosamine derivative (e.g., PAAG)) may be administered to the subject by inhalation with a dosage range from about 0.1 mg to about 100 mg, from about 0.1 mg to about 50 mg, from about 0.1 mg to about 20 mg, from about 0.1 mg to about 10 mg, from about 0.1 mg to about 5 mg, from about 1 mg to about 100 mg, from about 1 mg to about 50 mg, from about 1 mg to about 20 mg, from about 1 mg to about 10 mg, from about 1 mg to about 5 mg.

In some embodiments, the compounds described herein (e.g., polyglucosamine derivative (e.g., PAAG)) may be administered to the subject with a dosage range as described above every 4 to 120 hours or according to the requirements of the particular drug. In some embodiments, the compounds described herein (e.g., polyglucosamine derivative (e.g., PAAG)) may be administered by inhalation once daily. In some embodiments, the compounds described herein (e.g., polyglucosamine derivative (e.g., PAAG)) may be administered by inhalation once or twice a week. In some embodiments, the methods described herein may comprise administering to a subject in need thereof a composition described herein for an administration period comprising at least one 1 month, 2 months, 3 months, 4 months, 5 months or 6 months. In one embodiment, an administration period is followed by a period where no composition is administered (referred to as "off period"), which is followed by another administration period. The off period, in one embodiment is about 1 month, about 2 months, about 3 months, about four months, about five months or about 6 months. In some embodiments, the methods described herein may comprise administering to a subject in need thereof a composition described herein for administration period of about 6 months. In some embodiments, the methods described herein may comprise administering to a subject in need thereof a composition described herein for administration period for at least 6 months. The methods herein contemplate administration of an effective amount of compound or compound composition to achieve the desired or stated effect.

In some embodiments, the compounds described herein (e.g., polyglucosamine derivative (e.g., PAAG)) formulated, for example, for administration by inhalation, may be combined with an aqueous carrier (e.g., sterile water) at a concentration of about 50 µg/mL to about 1000 µg/mL (e.g., from about 50 µg/mL to about 500 µg/mL, from about 100 µg/mL to about 1000 µg/mL, from about 100 µg/mL to about 500 µg/mL from about 200 µg/mL to about 600 µg/mL, or from about 200 µg/mL to about 400 µg/mL). In some embodiments, the compounds described herein (e.g., polyglucosamine derivative (e.g., PAAG)) formulated, for example, for administration by inhalation, may be combined with an aqueous carrier (e.g., sterile water) at a concentration of about 100 µg/mL, about 150 µg/mL, about 200 µg/mL, or about 250 µg/mL. In some embodiments, the preparation of formulation for administration by inhalation will include a carrier to provide osmotic balance to the lungs.

Lower or higher doses than those recited above may be required. Specific dosage and treatment regimens for any particular patient will depend upon a variety of factors, including the activity of the specific compound employed, the age, body weight, general health status, sex, diet, time of administration, rate of excretion, drug combination, the severity and course of the disease, condition or symptoms, the patient's disposition to the disease, condition or symptoms, and the judgment of the treating physician.

Upon improvement of a patient's condition, a maintenance dose of a compound, composition or combination of this invention may be administered, if necessary. Subsequently. the dosage or frequency of administration, or both, may be reduced, as a function of the symptoms, to a level at which the improved condition is retained when the symptoms have been alleviated to the desired level. Patients may, however, require intermittent treatment on a long-term basis upon any recurrence of disease symptoms.

Subject

The subject can be a human or an animal. Suitable animal subjects include: but are not limited to, pet, wild, zoo, laboratory, and farm animals. Suitable animal subjects include primates, mammals, rodents, and birds. Examples of said animals include, but not limited to, guinea pigs, hamsters, gerbils, rat, mice, rabbits, dogs, cats, horses, pigs, sheep, cows, goats, deer, rhesus monkeys, monkeys, tamarinds, apes, baboons, gorillas, chimpanzees, orangutans, gibbons. fowl, e.g., pheasant, quail (or other gamebirds), a waterfowl, ostriches, chickens. turkeys, ducks, and geese or free flying bird. In some embodiments, the subject is a human (i.e., a male or female of any age group, e.g., a pediatric subject (e.g., infant, child, adolescent) or adult subject (e.g., young adult, middle-aged adult or senior adult).

A contemplated patient has a chronic NTM infection. In some embodiments, the patient has a chronic, recalcitrant NTM infection.

A contemplated patient may also suffer from complications of bronchiectasis, or cystic fibrosis. Bronchiectasis is a lung disease associated with enlargement of small airways. This leads to a slowed movement of mucus out of the lungs. Holding mucus in the airways may lead to repeated lung infections causing more damage. Cystic fibrosis (also known as CF, mucovoidosis, or mucoviscidosis) is a hereditary disease affecting the exocrine (mucous) glands of the lungs, liver, pancreas. and intestines. causing progressive disability due to multisystem failure. CF is caused by a mutation in the gene cystic fibrosis transmembrane conductance regulator (CFTR). The product of this gene is a chloride ion channel important in creating sweat, digestive juices and mucus. CF is considered an autosomal recessive disease.

Symptomatic diseases and complications associated with bronchiectasis or CF include, e.g., lung and sinus diseases: gastrointestinal, liver and pancreatic diseases; endocrine diseases; and infertility. For example, lung disease results from clogging the airways due to mucosa buildup and resulting inflammation. Some of these symptoms occur when bacteria that normally inhabit the thick mucus grow out of control and cause pneumonia. In later stages of CF, changes in the architecture of the lung further exacerbate chronic difficulties in breathing. Other symptoms include coughing up blood (hemoptysis), changes in the major airways in the lungs (bronchiectasis), high blood pressure in the lung (pulmonary hypertension), heart failure, difficulties getting enough oxygen to the body (hypoxia), respiratory failure requiring support with breathing masks such as bilevel positive airway pressure machines or ventilators, allergic bronchopulmonary aspergillosis, and infection with *Mycobacterium avium* complex (MAC) or *Mycobacterium abscessus* complex (MABSC). Mucus in the paranasal sinuses is equally thick and may also cause blockage of the sinus passages, leading to infection. This may cause facial pain, fever, nasal drainage, and headaches. Individuals with bronchiectasis or CF may develop overgrowth of the nasal tissue (nasal polyps) due to inflammation from chronic sinus infections. These polyps can block the nasal passages and increase breathing difficulties.

In some embodiments, the subject has a lung disease, e.g., a lung disease as described herein. In some embodiments, the subject has respiratory tract infections (e.g., airway infections, lung infections, pneumonia, and chronic sinusitis) or complications (e.g., infections or increased pulmonary mucosal viscosity or inflammation) of cystic fibrosis. In some embodiments, a patient in need of treatment with one of the methods described herein is a bronchiectasis patient, a cystic fibrosis patient, a ciliary dyskinesia patient, a chronic smoker, a chronic obstructive pulmonary disorder (COPD) patient, or a patient who has been previously non-responsive to treatment. In some embodiments, the patient in need of treatment of the NTM infection is a bronchiectasis patient. In some embodiments, the bronchiectasis is non-cystic fibrosis (CF) bronchiectasis. In another embodiment, the bronchiectasis is associated with CF in a patient in need of treatment. In another embodiment, the patient in need of treatment of the NTM infection is a COPD patient. In yet another embodiment, the patient in need of treatment of the NTM infection is an asthma patient.

A contemplated patient subjected to the methods described herein, in some embodiments, has a comorbid condition. For example, in some embodiments, the patient in need of treatment with one of the methods described herein has diabetes, mitral valve disorder (e.g., mitral valve prolapse), acute bronchitis, pulmonary hypertension, pneumonia, asthma, trachea cancer, bronchus cancer, lung cancer, cystic fibrosis, pulmonary fibrosis, a larynx anomaly, a trachea anomaly, a bronchus anomaly, aspergillosis, HIV or bronchiectasis, in addition to the NTM infection.

In some embodiments, a contemplated patient subjected to one of the methods for treating NTM described herein exhibits an NTM culture conversion to negative during the administration period of the composition described herein, or after the administration period has concluded. The time to conversion, in some embodiments, is about 10 days, or about 20 days or about 30 days or about 40 days, or about 50 days, or about 60 days, or about 70 days, or about 80 30 days, or about 90 days, or about 100 days or about 110 days. In another embodiment, the time to conversion is from about 20 days to about 200 days, from about 20 days to about 190 days, from about 20 days to about 180 days, from about 20 days to about 160 days, from about 20 days to about 150 days, from about 20 days to about 140 days, from about 20 days to about 130 days, from about 20 days to about 120 days, from about 20 days to about 110 days, from about 30 days to about 110 days, or from about 30 days to about 100 days.

In some embodiments, the subject has diseases or conditions characterized by the presence of one or more of the bacteria that cause resistant bacterial infection as described herein.

EXAMPLES

In order that the invention described herein may be more fully understood, the following examples are set forth. The examples described in this application are offered to illustrate the pharmaceutical compositions and methods provided herein and are not to be construed in any way as limiting their scope.

Figure 1B:
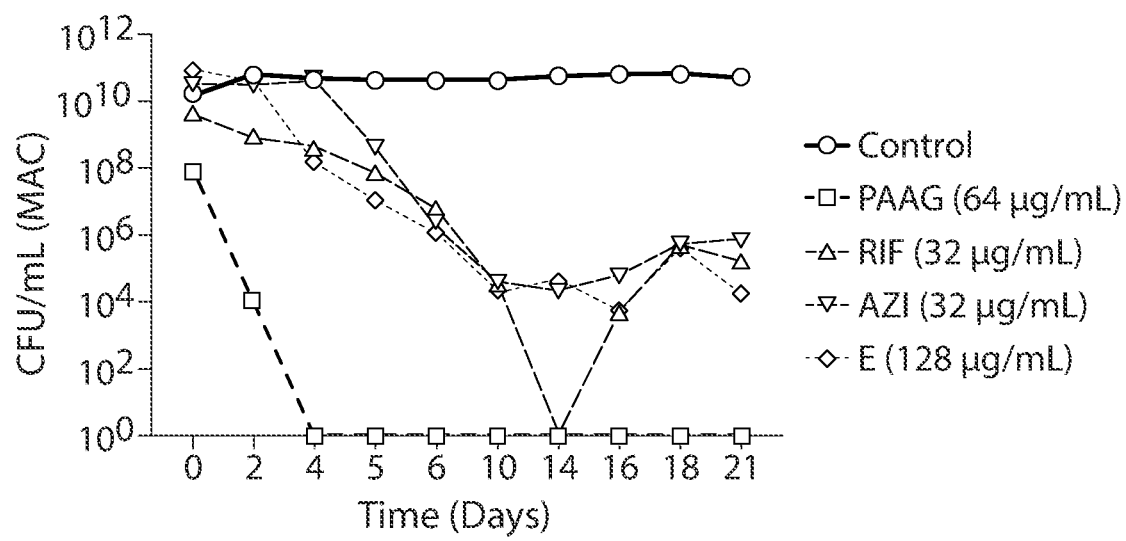
FIG. 1B shows an evaluation of persister formation in nontuberculosis *Mycobacterium avium* complex (MAC) following treatment with standard of care antibiotic or PAAG.

Example 1. Evaluation of Persister Formation in MAC and MABSC Following Treatment with PAAG or Standard of Care Antibiotic As shown in FIG. 1A and FIG. 1B for MABSC and MAC cultures, respectively, the bacterial cultures treated with standard of care antibiotics were found to show a biphasic killing pattern resulting in the formation of persister cells as they were not completely eradicated with the treatment and regrew after the antibiotic was removed. In contrast, treatment with PAAG (250 µg/mL) resulted in complete eradication of rapid growing MABSC and slow growing MAC with no regrowth observed even after PAAG removal from the media.

For MABSC cultures, a modified time kill analysis was performed over a period of 12 days and included a 7-day recovery phase in antimicrobial free media post treatment. PAAG treatment led to eradication of MABSC cell population within 48 hours of treatment. No regrowth was observed in the 7-day recovery period in PAAG-treated cultures compared to the standard of care antibiotic treated MABSC cultures.

For MAC cultures, a modified time kill analysis was performed over a period of 21 days and included a 7-day recovery phase in antimicrobial free media post treatment. PAAG treatment led to eradication of MAC cell population within 4 days of treatment. No regrowth was observed in the 7-day recovery period in PAAG-treated cultures compared to the standard of care antibiotic treated MABSC cultures.

Accordingly, PAAG eradicates non-tuberculosis MABSC and MAC without forming persisters.

Example 2. Persister Formation and Treatment in MABSC and MAC

Figure 2A:
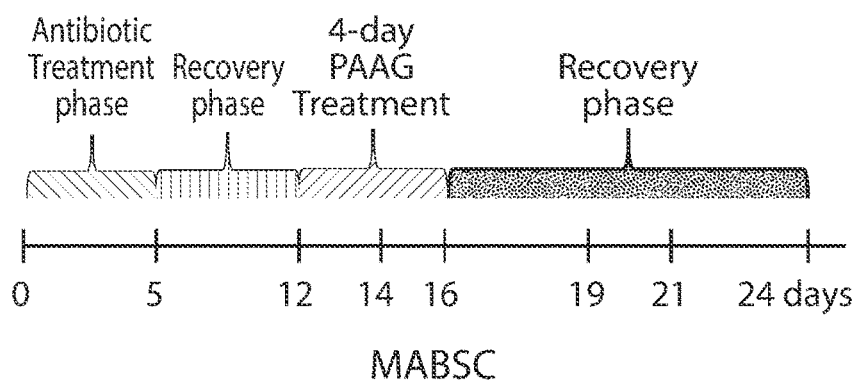
FIG. 2A shows a schematic of persister formation and exemplary treatment for nontuberculosis MABSC with PAAG.
Figure 2B:
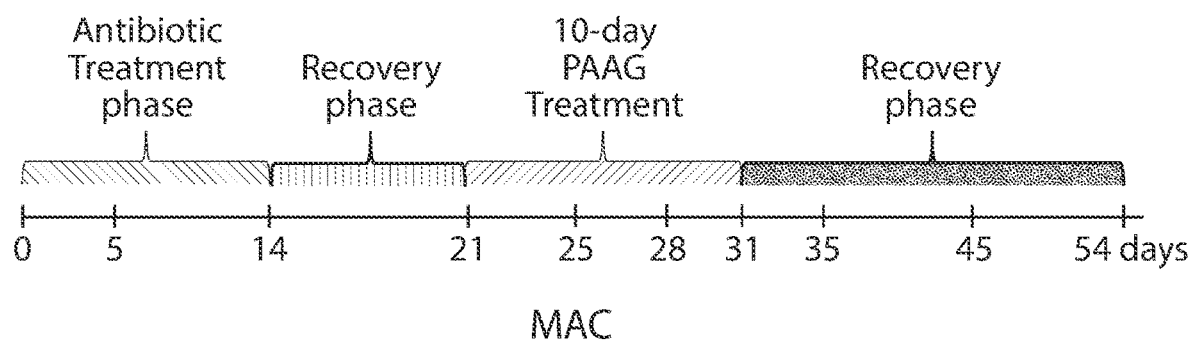
FIG. 2B shows a schematic of persister formation and exemplary treatment in nontuberculosis MAC with PAAG.

FIG. 2A and FIG. 2B show the experimental layout of persister formation and treatment in MABSC and MAC, respectively. The MABSC and MAC cultures were grown for 7 and 21 days respectively, prior to treatment with antibiotics amikacin, rifampicin, ciprofloxacin, azithromycin or ethambutol for 5 and 14 days respectively for the two cultures (i.e., antibiotic treatment phase). The cultures were then pelleted, washed free of antibiotics and resuspended in broth free of any antimicrobials (i.e., recovery phase). Post recovery phase, the cultures were treated with PAAG for 4 or 10-days for MABSC and MAC respectively. Post PAAG treatment, the cultures were pelleted, washed free of PAAG and resuspended in fresh broth 12 or 24 days to check for regrowth (i.e., recovery phase).

Figure 3A:
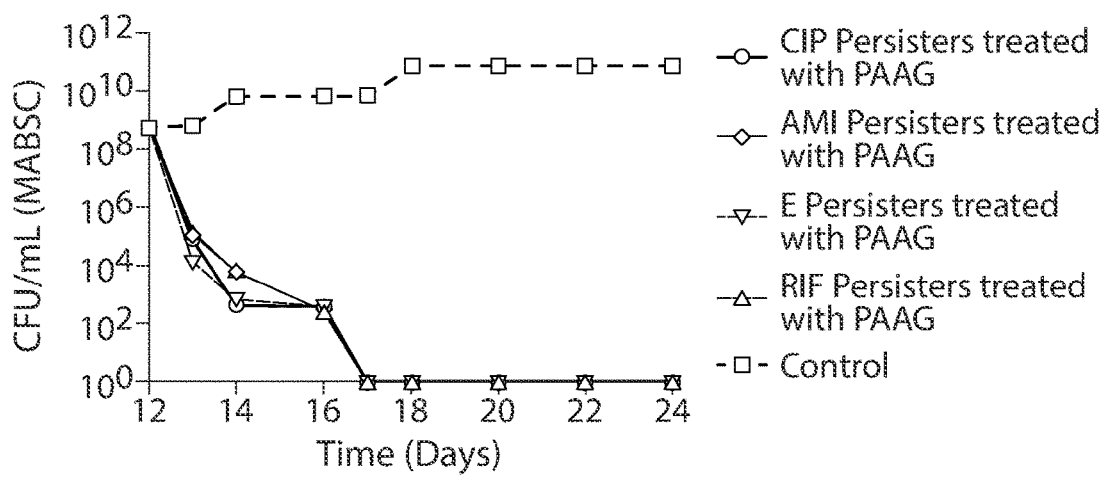
FIG. 3A shows treatment with PAAG in antibiotic induced NTM persisters for MABSC.
Figure 3B:
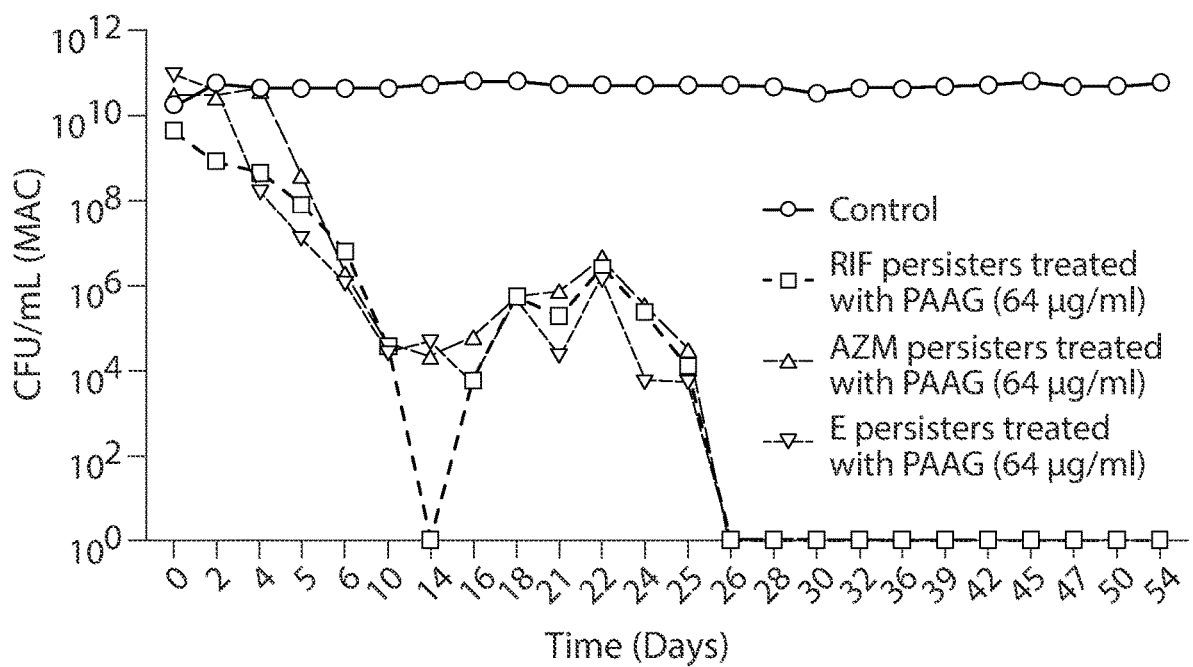
FIG. 3B shows treatment with PAAG in antibiotic induced NTM persisters for MAC.

As shown in FIG. 3A and FIG. 3B, PAAG eradicates persister cells of MABSC and MAC. After the initial recovery phase, day 12 and 21 for MABSC and MAC cultures respectively that had survived following antibiotic treatment were treated with PAAG. After treatment for 4 days or 10-days for MABSC and MAC cultures respectively with PAAG, CFU/mL was 0 and none of the persisters in either strain showed regrowth. This demonstrates that PAAG eradicated antibiotic induced NTM persisters for both MABSC and MAC and prevents further NTM persister formation.

Figure 4A:
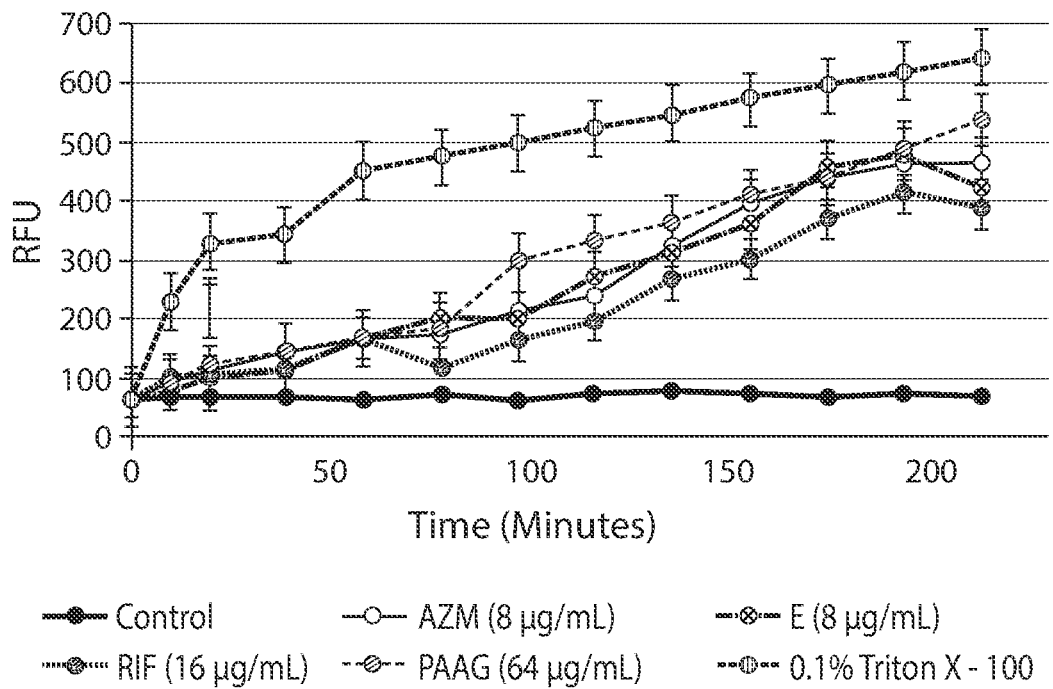
FIG. 4A shows fluorescence of outer membrane of MAC treated with PAAG or standard of care antibiotics.
Figure 4B:
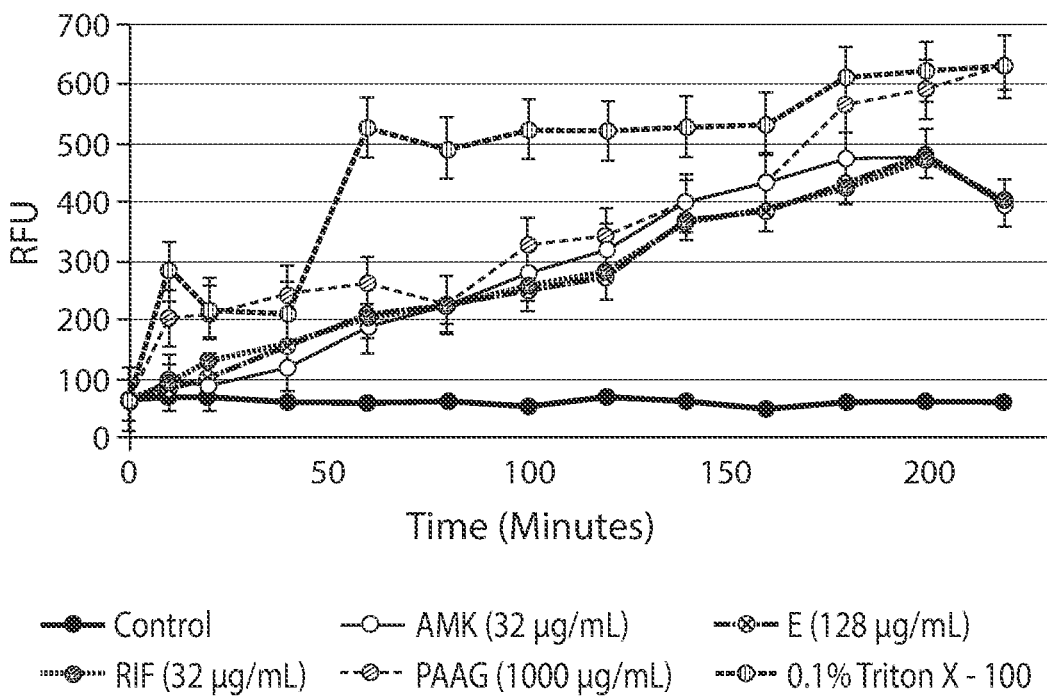
FIG. 4B shows fluorescence of outer membrane of MABSC treated with PAAG or standard of care antibiotics.

Example 3. PAAG Permeabilizers Bacterial Membranes and Cell Wall of MAC and MABSC Rapid permeabilization of the NTM by PAAG was confirmed by both propidium iodide and membrane depolarization. The ability of PAAG and standard of care antibiotics to permeabilize the outer membrane of MAC and MABSC was assessed at 4× the MIC concentration of each antibiotic using propidium iodide. An increase in fluorescence is indicative of pore formation (i.e., permeabilization) in the bacterial cell wall, as propidium iodide penetrates the bacteria. Data is shown for *M. avium* (FIG. 4A) and *M. abscessus* (FIG. 4B) treated with an antibiotic (rifampicin (RIF), ethambutol (E), azithromycin (AZM)) or PAAG.

Figure 5A:
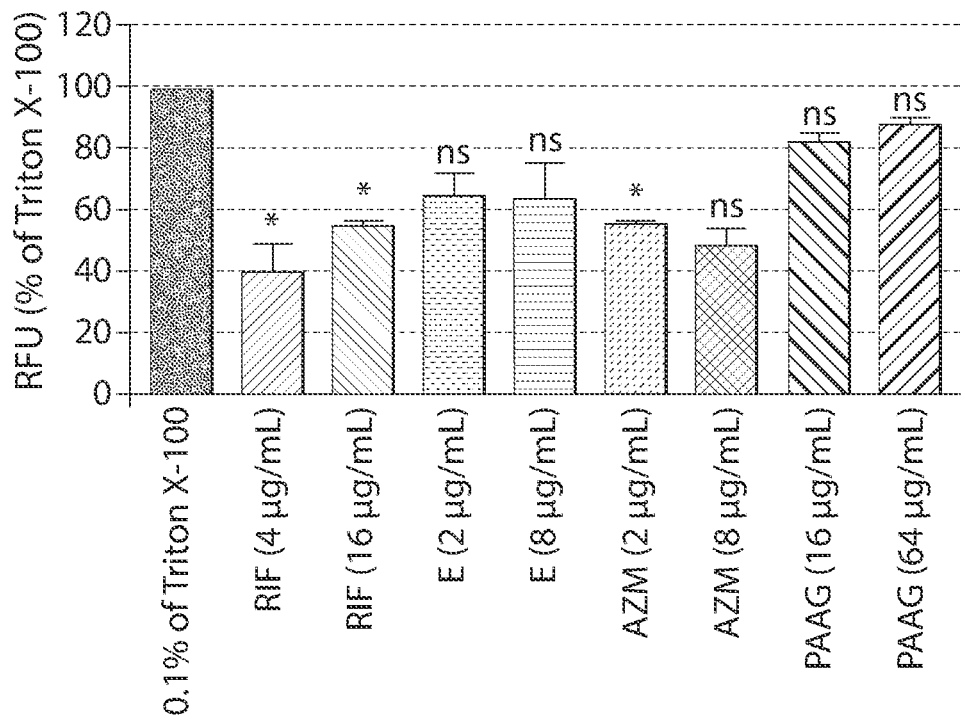
FIG. 5A shows membrane depolarization activity of PAAG and antibiotics for MAC.
Figure 5B:
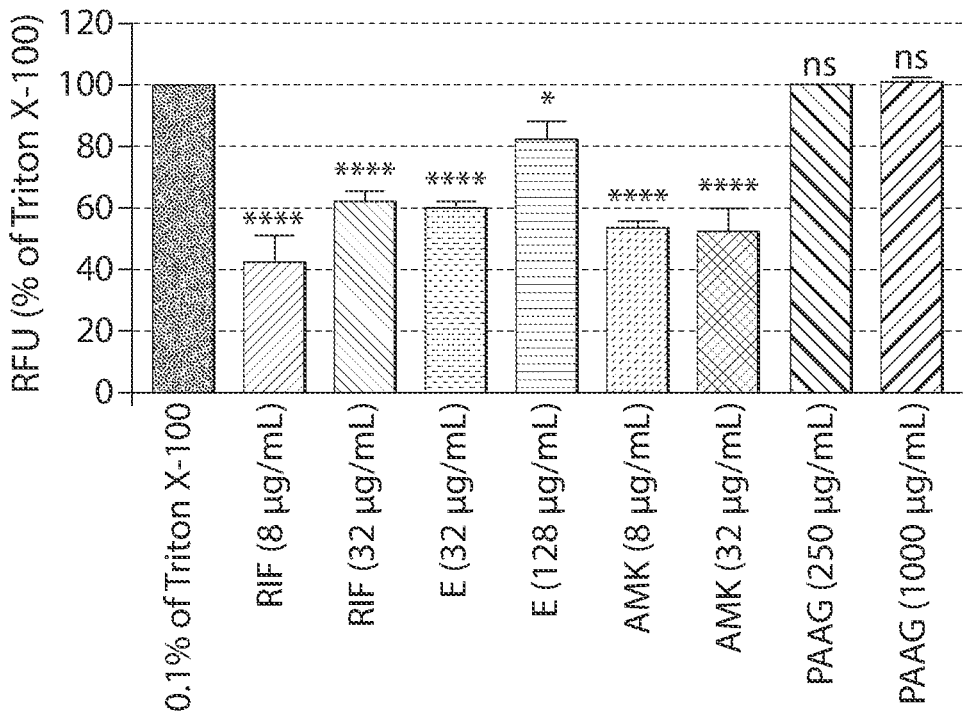
FIG. 5B shows membrane depolarization activity of PAAG and antibiotics for MABSC.

Membrane depolarization activity of PAAG and antibiotics (rifampicin (RIF), ethambutol (E), azithromycin (AZM), amikacin (AMK)) was assessed using 3,3'-dimethyloxacarbocyanine iodide (DioC2) on *M. avium* (FIG. 5A) and *M. abscessus* (FIG. 5B), with PAAG showing similar disruption to the detergent Triton X-100. Data shown corresponds with 1× and 4× the MIC of the tested antibiotics or PAAG. Statistical analysis was done using Dunnett's multiple comparison tests compared to the positive control. In FIG. 5A and FIG. 5B, * refers to $p<0.05$;  is $p<0.01$; ** is $p<0.0001$; "ns" refers to no significant difference compared to the positive control, Triton X-100. The data show that PAAG overcomes the low metabolic activity of the bacteria to permeabilize NTM cell walls.

Figure 6A:
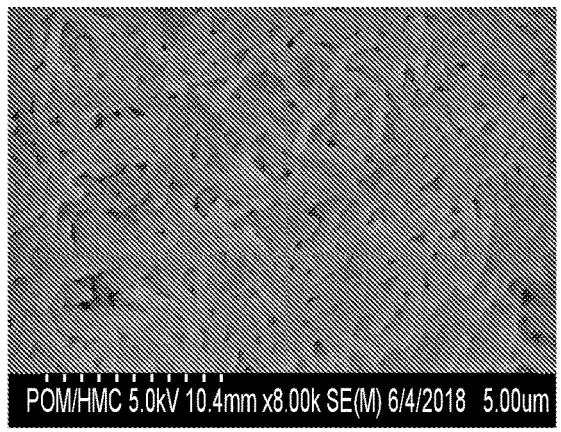
FIG. 6A shows an SEM image of MABSC culture prior to treatment with PAAG.
Figure 6B:
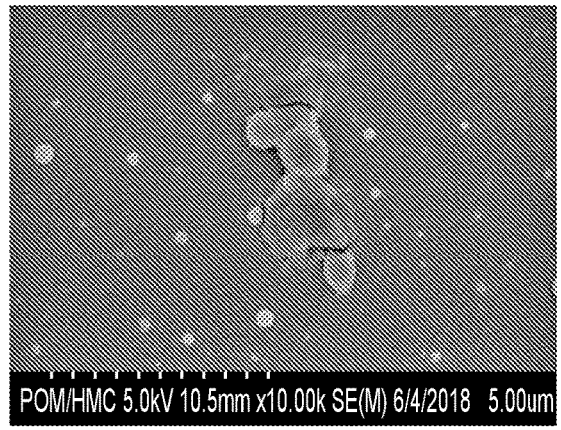
FIG. 6B shows an SEM image of MABSC culture after treatment with PAAG.
Figure 6C:
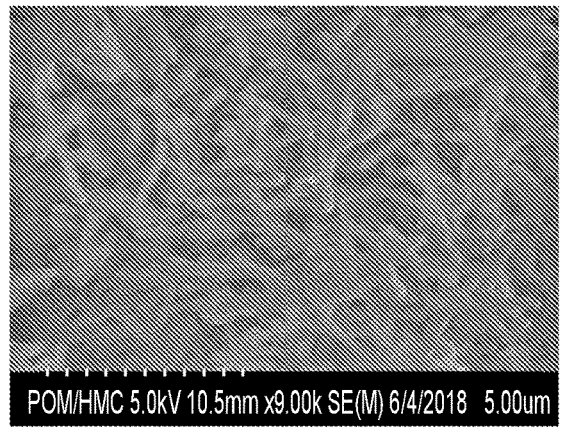
FIG. 6C shows an SEM image of MAC culture prior to treatment with PAAG.
Figure 6D:
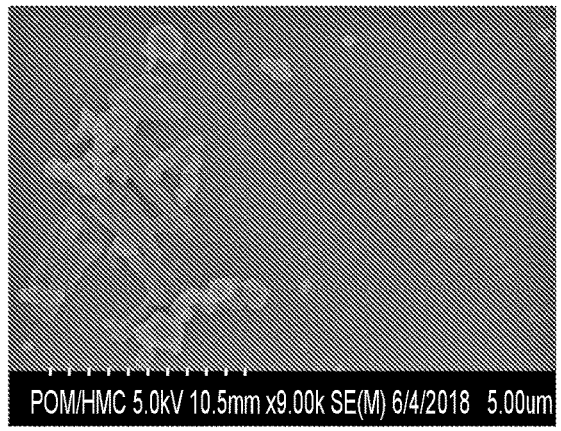
FIG. 6D shows an SEM image of MAC culture after treatment with PAAG.

Structural disruption and biofilm removal were additionally confirmed by scanning electron microscopy (SEM) imaging. SEM was used to visualize the effects of PAAG on the bacterial structure. Biofilms were grown in vitro using the colony biofilm model for 4-12 days and treated with PAAG. FIG. 6A and FIG. 6C show the MABSC and MAC cultures prior to treatment with PAAG. respectively, and FIG. 6B and FIG. 6D show after treatment with PAAG at a concentration of 200 μg/mL for 1 hour and processed for SEM imaging in MABSC and MAC, respectively. The bacterial cells forming the control biofilms demonstrated a smoother surface with a "normal rod like" shape. In contrast, PAAG treatment results in biofilm removal and subsequent formation of cell debris accompanied by morphological differences in the structure associated with Mycobacteria.

PAAG showed the ability to reduce the cohesion of the Mycobacteria strains grown as biofilm, thereby facilitating biofilm removal. PAAG treatment also led to the deformation and collapse of the bacterial structure. PAAG eradicates *M. avium* (MAC) and *M. abscessus* (MABSC) by permeabilizing bacterial membranes and the cell wall. Thus, PAAG results in rapid removal and NTM cellular disruption.

Figure 7:
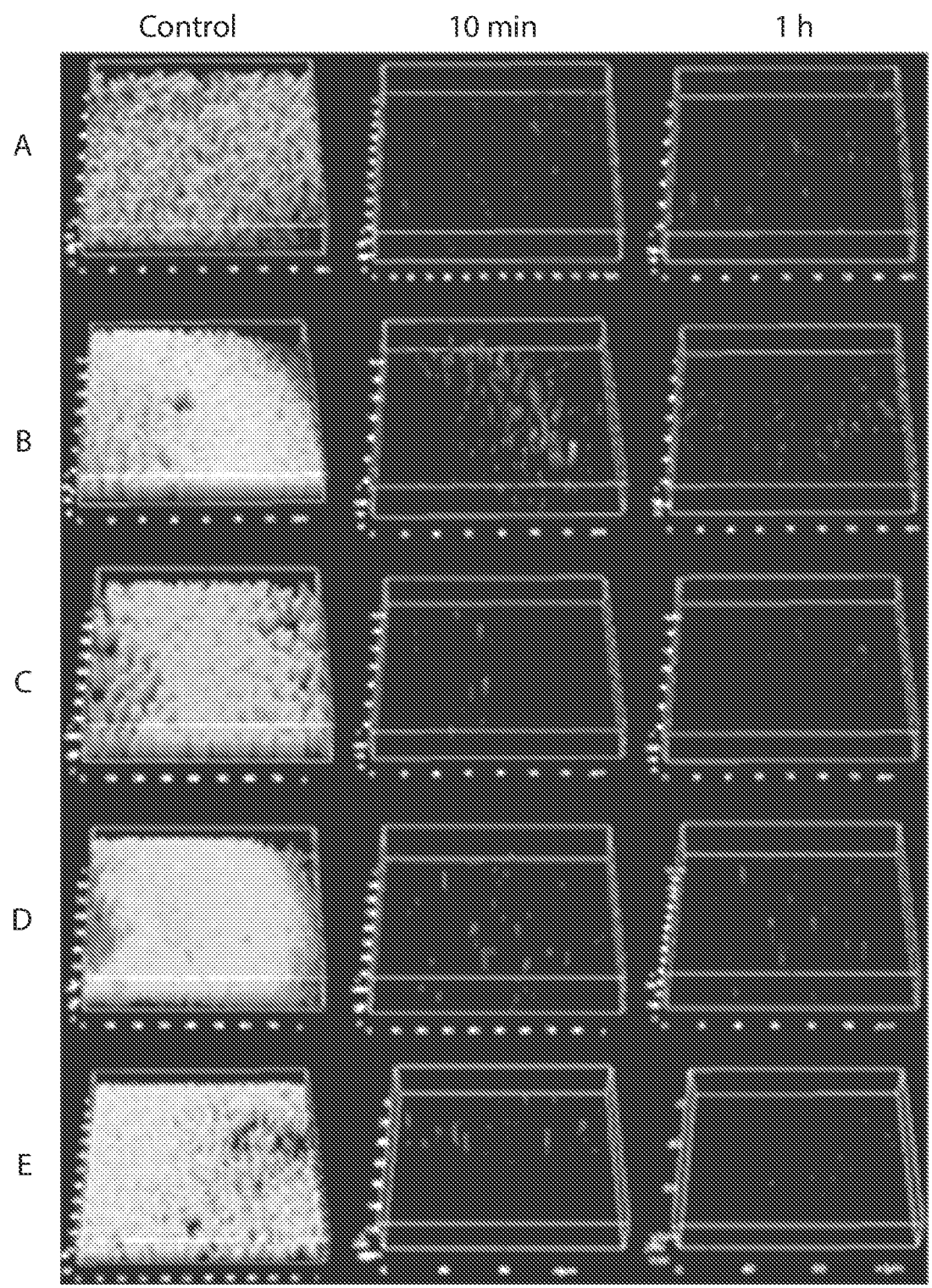
FIG. 7 shows representative images of LIVE/DEAD stained NTM biofilms treated with PAAG as visualized by CLSM.
Figure 8:
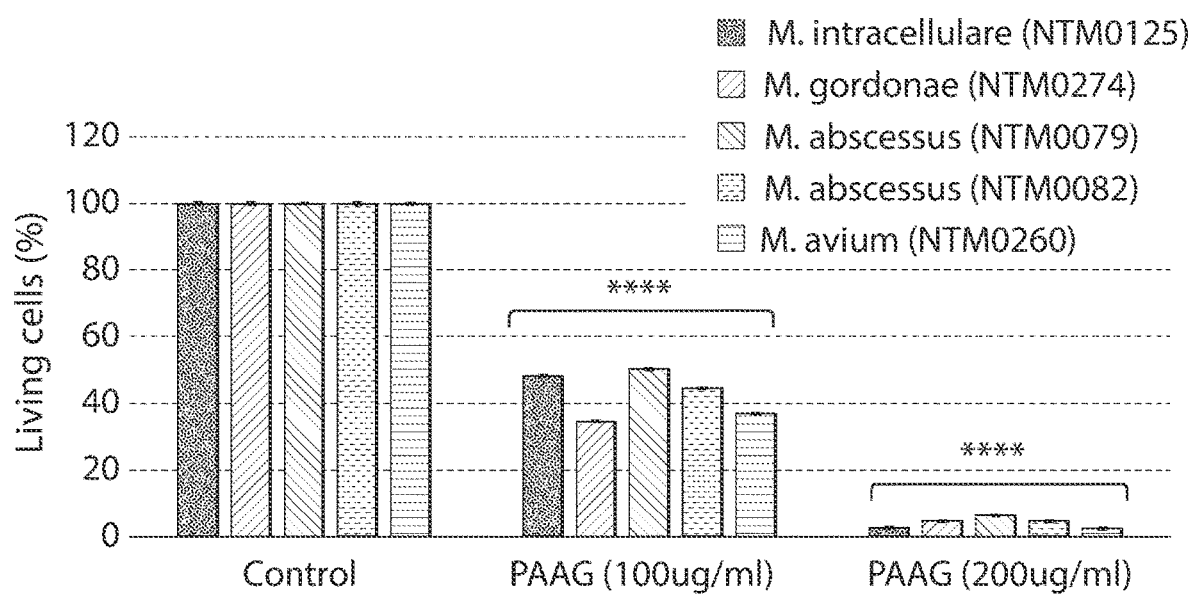
FIG. 8 shows the quantification of LIVE bacteria in PAAG-treated NTM biofilms.

In addition, NTM biofilms were treated with PAAG and the effects were visualized by confocal scanning laser microscopy (CSLM). For example, FIG. 7 shows the representative images of LIVE/DEAD stained NTM biofilms treated with 200 μg/mL of PAAG for 10 minutes or 1-hour visualized by CSLM. Control is 1.38% glyceol, pH. 7.4. In FIG. 7, (A) *M. intracellulare* NTM0125, (B) *M. abscessus* complex NTM0079, (C) *M. abscessus* complex NTM0082, (D) *M. gordonae* NTM0274, and (E) *M. avium* complex NTM0260. (Green=live; Red=dead). Scale bar=10 μm. The average thickness measurement for the control biofilms was found to be 42.6 μm. CLSM and live/dead staining verified 65% reduction in the viability of all treated strains within 10 minutes post PAAG treatment. CLSM was used to measure the number of LIVE labeled (SYTO 9 labeled) bacteria following 1-hour treatment with PAAG. FIG. 8 shows the quantification of bacteria in PAAG-treated NTM biofilms (****=$p<0.0001$).

Example 4. Anti-Biofilm Activity of PAAG for NTM

Biofilm cultures of Mycobacteria isolates were grown for 48 hours in static 96-well plates at 37 C on a static incubator. The biofilm cultures were treated using PAAG alone and in formulation with 1.38% glycerol for an hour. The MBEC assay measured the logarithmic reduction in the growth of biofilm by serial dilution and spot plate method. PAAG was observed to show a two to three log reduction (varies from strain to strain) in biofilm, compared to the control, in a dose dependent manner. The static assay was used to measure the decrease in biofilm density as the dose of PAAG increases by staining each well with crystal violet and measuring the biofilm densities at 590 nm. A dose dependent reduction in the density of the bacteria was observed.

Figure 9:
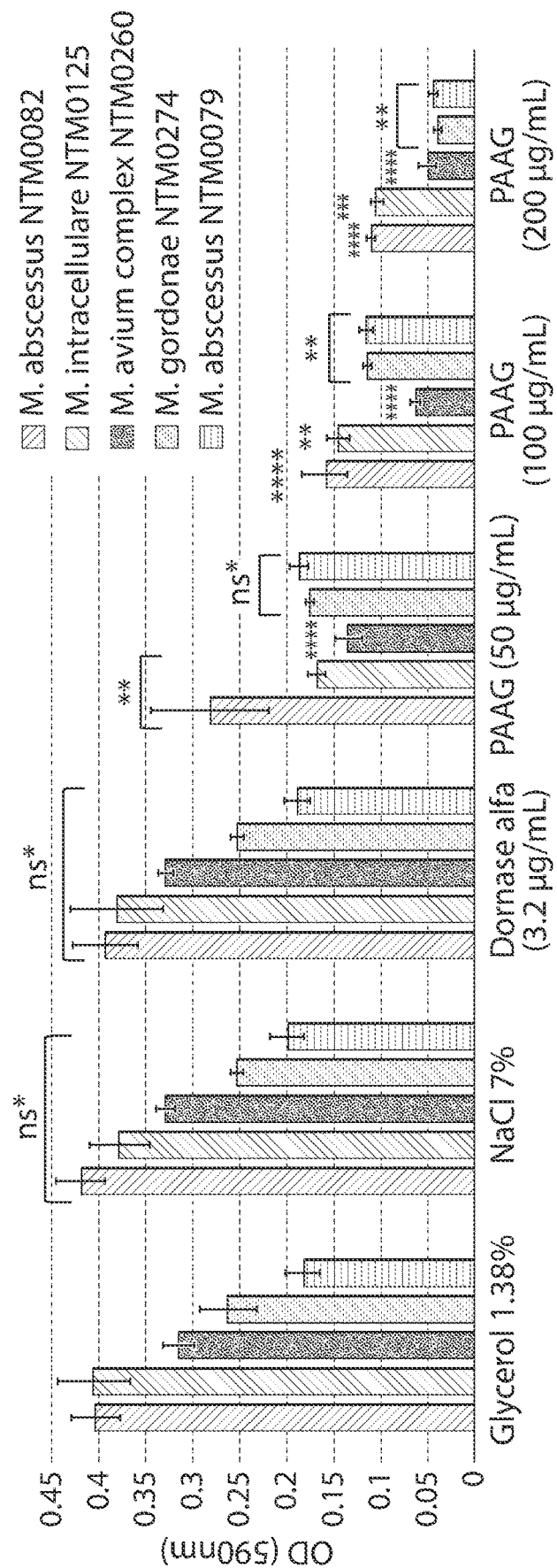
FIG. 9 shows the quantification of biofilm biomass using crystal violet staining for NTM biofilms treated with PAAG.

FIG. 9 shows the biofilm removal activity of PAAG tested at 50 μg/mL, 100 μg/mL, and 200 μg/mL for *Mycobacterium intracellulare, Mycobacterium abscessus* 079, *Mycobacterium abscessus* 082, *Mycobacterium gordonae*, and *Mycobacterium avium*. The biofilm biomass was quantified using crystal violet staining in static TCP biofilm assay. In FIG. 9, **=$p<0.0001$; *=$p<0.001$; **=$p<0.01$; and ns*=data is not significantly different from the vehicle control ($p>0.05$).

Figure 10:
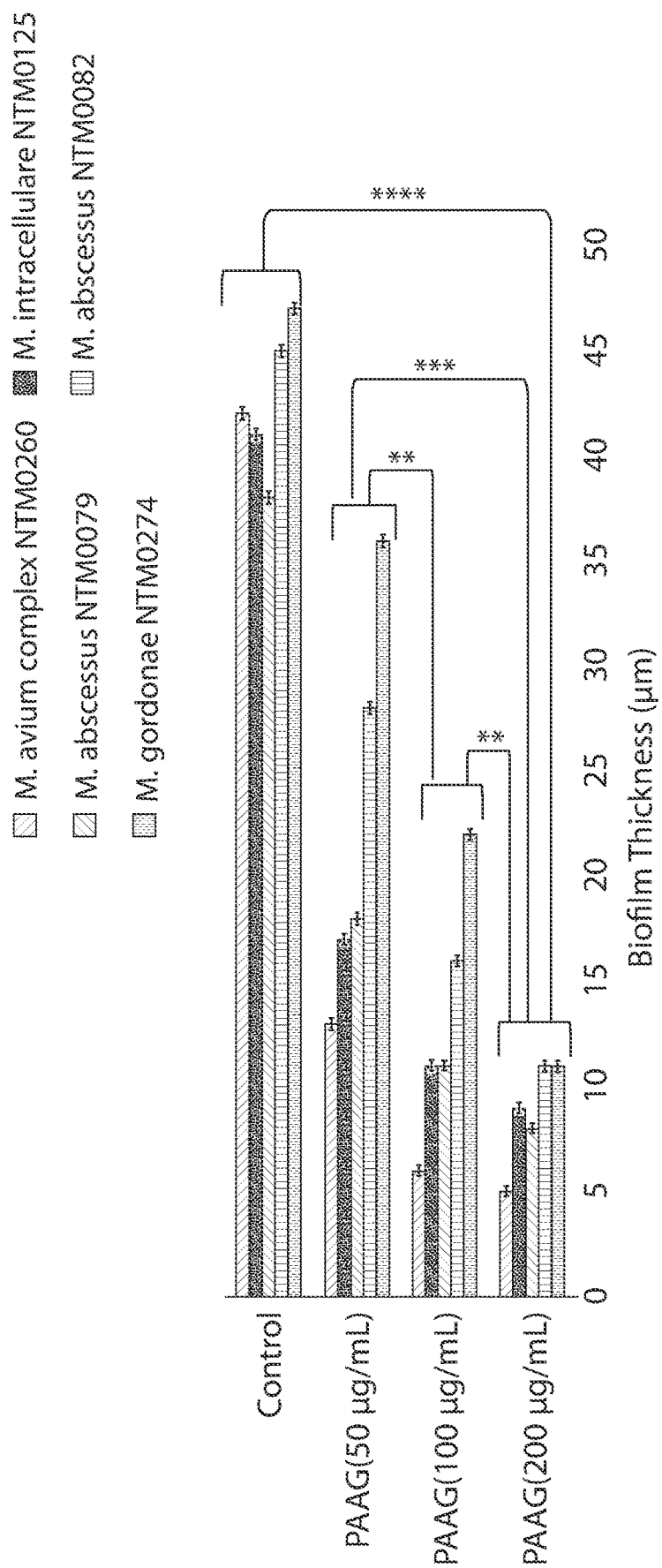
FIG. 10 shows the biofilm thickness for NTM biofilms treated with PAAG.

The biofilm thickness was optically measured assuming the Refractive Index (RI) of the biofilm was equal to water per Bakke & Olsson, et al., (1986). FIG. 10 shows the biofilm thickness for *Mycobacterium intracellulare, Mycobacterium abscessus* 079, *Mycobacterium abscessus* 082, *Mycobacterium gordonae*, and *Mycobacterium avium* rinsed with PAAG at 50 μg/mL, 100 μg/mL, and 200 μg/mL. FIG. 10 shows PAAG significantly decreased bacterial viability at depths>5-10 μm. PAAG was associated with a reduction in BCC biofilm thickness in a dose dependent manner.

Example 5. PAAG Potentiates Antibiotics Against NTM and NTM in Biofilms

PAAG synergy with conventional antibiotics was determined by 2D checkerboard analysis. PAAG's antimicrobial activity and antibiotic potentiation in a biofilm were determined by minimum biofilm eradication concentration (MBEC) and 2D MBEC checkerboard assays to determine antibiotic potentiation with PAAG within a biofilm.

Table 1 shows the clinical breakpoints according to CLSI standards (≥1 μg/mL (R) for Rifampicin; ≥2 μg/mL (R) for Ethambutol, ≤16 μg/mL (S), 32 μg/mL (I), ≥64 μg/mL (R) for Amikacin: ≥8 μg/mL (R), 4 μg/mL (I), ≤2 μg/mL (S) for Azithromycin, ≥4 μg/mL (R), 2 μg/mL (I), ≤1 μg/mL (S) for Ciprofloxacin. R—Resistant, S—Sensitive, I—Intermediate.

TABLE 1

PAAG and standard of care antibiotic MIC of CF NTM clinical isolates

| Repository (NTM) | Species | MIC (µg/mL) | | | | | |
|---|---|---|---|---|---|---|---|
| | | PAAG | Rifampicin | Ethambutol | Amikacin | Azithromycin | Ciprofloxacin |
| 0260 | M. avium complex | 16 | 4 (R) | 2 (R) | 2 (S) | 2 (I) | 0.125 (S) |
| 0813 | M. avium complex | 16 | 4 (R) | 2 (R) | 2 (S) | 2 (I) | 0.125 (S) |
| 0003 | M. abscessus subsp. bolletii | 128 | 8 (R) | 8 (R) | 4 (S) | 32 (R) | 16 (R) |
| 0079 | M. abscessus subsp. abscessus | 250 | 2 (R) | 32 (R) | 8 (R) | 32 (R) | 8 (R) |
| 0082 | M. abscessus subsp. abscessus | 250 | 2 (R) | 32 (R) | 8 (R) | 32 (R) | 8 (R) |
| 0274 | M. gordonae | 32 | 2 (R) | 2 (R) | <0.0625 (S) | 2 (I) | <0.0625 (S) |

As shown in Table 2, PAAG potentiates antibiotics against NTM as measured with minimum inhibitory concentration (MIC).

TABLE 2

Number of fold change based on PAAG used at half (8 µg/mL and 128 µg/mL respectively) of its MIC

| | MAC NTM 0260 | | | MABSC NTM 0082 | | |
|---|---|---|---|---|---|---|
| Antibiotic | MIC (µg/mL) | MIC with PAAG (µg/mL) | Fold Change | MIC (µg/mL) | MIC with PAAG (µg/mL) | Fold Change |
| Rifampicin | 4 | 1 | 4 | 2 | 0.06 | 21 |
| Ethambutol | 2 | 1 | 2 | 32 | 0.25 | 128 |
| Amikacin | | | | 32 | 0.06 | 533 |
| Azithromycin | 2 | 0.5 | 4 | 32 | 0.06 | 533 |
| Ciprofloxacin | | | | 8 | 0.06 | 133 |

In addition, PAAG potentiates antibiotics against NTM in biofilms as measured with minimum biofilm eradication concentration (MBEC) (Table 3).

TABLE 3

Number of fold change based on the value measured using PAAG at half (8 µg/mL and 128 µg/mL respectively) of its MBEC

| | MAC | | | MABSC | | |
|---|---|---|---|---|---|---|
| Antibiotic | MBEC (µg/mL) | MBEC with PAAG (µg/mL) | Fold Change | MBEC (µg/mL) | MBEC with PAAG (µg/mL) | Fold Change |
| Rifampicin | 8 | <0.25 | >32 | >1024 | 2 | >512 |
| Ethambutol | >8 | <0.25 | >32 | >1024 | 2 | >512 |
| Amikacin | | | | >1024 | 2 | >512 |
| Azithromycin | 8 | 1 | 8 | >1024 | 2 | >512 |
| Ciprofloxacin | | | | >1024 | 2 | >512 |

PAAG works synergistically with standard of care antibiotics to significantly reduce the concentration of antibiotic needed to kill NTM bacteria and NTM bacteria in biofilms.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

The invention claimed is:

1. A method of treating an acute or chronic nontuberculosis mycobacteria (NTM) infection in a subject in need thereof, the method comprising administering to the subject an effective amount of a poly(acetyl, arginyl) glucosamine (PAAG) comprising the following Formula (I):

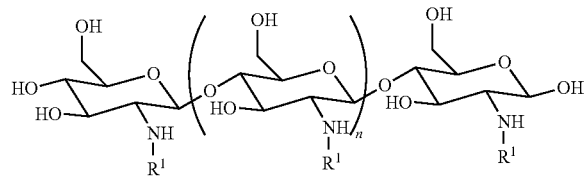

Formula (I)

wherein:
n is an integer between 20 and 6000; and each $R^1$ is independently selected for each occurrence from hydrogen, acetyl,

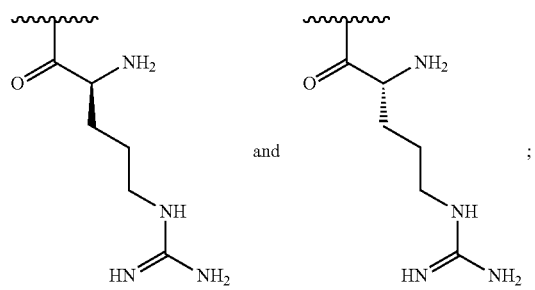 [SMILES: *C(=O)[C@@H](N)CCCNC(=N)N ; *C(=O)[C@H](N)CCCNC(=N)N]

wherein at least 25% of $R^1$ substituents are H, at least 1% of $R^1$ substituents are acetyl, and at least 2% of $R^1$ substituents are

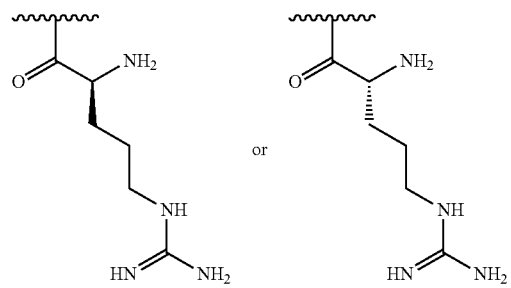

wherein the subject is unresponsive to a previously administered NTM therapy; and
wherein the treatment comprises achieving a negative NTM cell sputum culture of the subject.

2. The method of claim 1, wherein the NTM cells are NTM persister cells, NTM cells in stationary growth phase, slow growing NTM cells, or rapidly growing NTM cells, or a combination thereof.

3. The method of claim 1, wherein the NTM cells are NTM persister cells.

4. The method of claim 1, wherein the NTM infection is caused by bacteria selected from the group consisting of *Mycobacterium avium* complex (MAC), *Mycobacterium abscessus* complex (MABSC), *Mycobacterium gordonae*, and *Mycobacterium intracellular*, or a combination thereof.

5. The method of claim 1, wherein the method comprises disrupting a biofilm caused by the NTM infection.

6. The method of claim 1, wherein the method comprises disrupting mucus comprising a biofilm caused by the NTM infection.

7. The method of claim 6, wherein the disrupting reduces adhesion of the mucus to pulmonary epithelia.

8. The method of claim 1, wherein the method comprises inhibiting regrowth of a biofilm comprising NTM.

9. The method of claim 1, wherein the subject has a lung disease, cystic fibrosis (CF), chronic pulmonary disorder, primary ciliary dyskinesia, or non-CF bronchiectasis.

10. The method of claim 1, wherein the subject has been previously administered an NTM therapy.

11. The method of claim 10, wherein the NTM therapy is an antibiotic.

12. The method of claim 11, wherein the antibiotic is rifampicin, aztreonam, ethambutol, amikacin, azithromycin, or clarithromycin, or a combination thereof.

13. The method of claim 1, wherein the subject is concurrently administered a second NTM therapy.

14. The method of claim 1, further comprising administering to the subject an additional therapeutic agent.

15. The method of claim 14, wherein the additional therapeutic agent is selected from the group consisting of an antibiotic agent, an anti-inflammatory agent, and a vasodilator, or a combination thereof.

16. The method of claim 14, wherein the PAAG is administered to the subject prior to administration of the additional therapeutic agent.

17. The method of claim 14, wherein the PAAG is administered to the subject concurrently with administration of the additional therapeutic agent.

18. The method of claim 14, wherein the PAAG is administered to the subject subsequent to administration of the additional therapeutic agent.

19. A method of treating an acute or chronic nontuberculosis mycobacteria (NTM) infection in a subject in need thereof, the method comprising administering to the subject an effective amount of a poly (acetyl, arginyl) glucosamine (PAAG) comprising the following Formula (I):

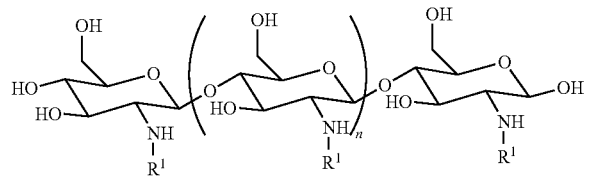

Formula (I)

wherein:

n is an integer between 20 and 6000; and each $R^1$ is independently selected for each occurrence from hydrogen, acetyl,

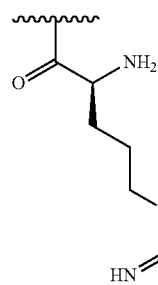 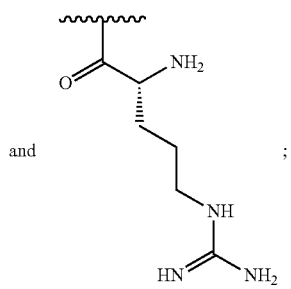

and ;

wherein at least 25% of $R^1$ substituents are H, at least 1% of $R^1$ substituents are acetyl, and at least 2% of $R^1$ substituents are

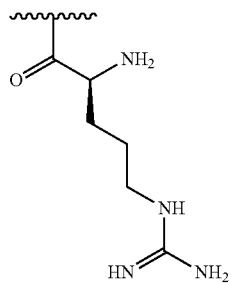 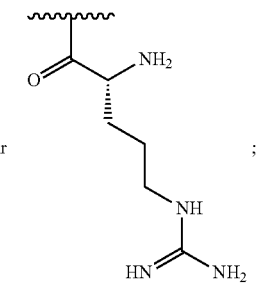

or ;

wherein the subject is unresponsive to a previously administered NTM therapy; and wherein the treatment results in an undetectable amount of NTM cells in the subject.

20. A method of eradicating an entire population of nontuberculosis mycobacteria (NTM) cells in an environment selected from the group consisting of a subject, a sample, a biofilm, a surface, and a medical device, the method comprising administering to the environment an effective amount of a poly (acetyl, arginyl) glucosamine (PAAG) comprising the following formula comprising the following Formula (I):

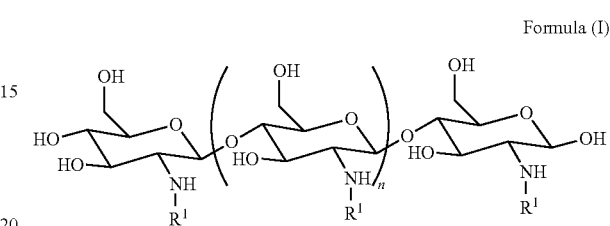

Formula (I)

wherein:

n is an integer between 20 and 6000; and each $R^1$ is independently selected for each occurrence from hydrogen, acetyl,

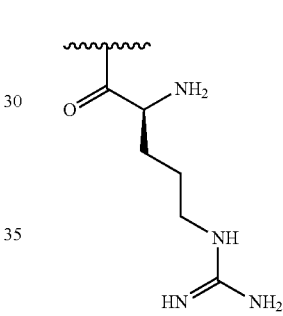 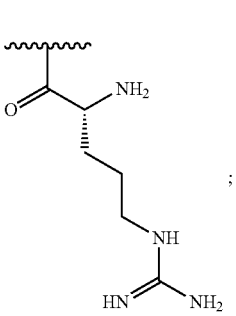

and ;

wherein at least 25% of $R^1$ substituents are H, at least 1% of $R^1$ substituents are acetyl, and at least 2% of $R^1$ substituents are

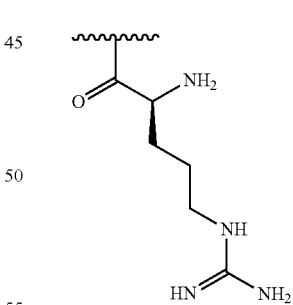 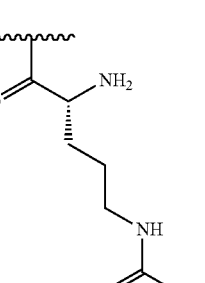

or .

* * * * *